(12) United States Patent
Rokadia et al.

(10) Patent No.: US 11,816,641 B2
(45) Date of Patent: Nov. 14, 2023

(54) SYSTEMS AND METHODS FOR TASK DISTRIBUTION AND TRACKING

(71) Applicant: TTX Company, Chicago, IL (US)

(72) Inventors: Hiren Y. Rokadia, Schaumburg, IL (US); Ronald W. Hessler, Arlington Heights, IL (US); Thomas W. Grove, Mokena, IL (US); Thomas M. Kingsley, Chicago, IL (US); Rich A. Rousseau, Crete, IL (US); Nitin Midha, Chicago, IL (US)

(73) Assignee: TTX Company, Chicago, IL (US)

( * ) Notice: Subject to any disclaimer, the term of this patent is extended or adjusted under 35 U.S.C. 154(b) by 0 days.

(21) Appl. No.: 16/531,821

(22) Filed: Aug. 5, 2019

(65) Prior Publication Data

US 2020/0097923 A1 Mar. 26, 2020

Related U.S. Application Data

(60) Provisional application No. 62/734,402, filed on Sep. 21, 2018.

(51) Int. Cl.
*G06Q 10/20* (2023.01)
*G06N 20/00* (2019.01)
*G06Q 10/0631* (2023.01)

(52) U.S. Cl.
CPC ..... *G06Q 10/20* (2013.01); *G06Q 10/063114* (2013.01); *G06N 20/00* (2019.01)

(58) Field of Classification Search
CPC ............... G06Q 10/20; G06Q 10/0637; G06Q 10/0633; G06Q 10/063; G06Q 10/00;
(Continued)

(56) References Cited

U.S. PATENT DOCUMENTS 10,319,094 B1 * 6/2019 Chen ..................... G06N 3/08
10,346,969 B1 * 7/2019 Raghu ............... G01N 21/8803
(Continued)

FOREIGN PATENT DOCUMENTS

WO WO-2019157288 A1 * 8/2019 ............ G01M 17/00

OTHER PUBLICATIONS

Balasubramanian, R., Libarikian, A., & McElhaney, D. (2018). Insurance 2030—The impact of AI on the future of insurance. McKinsey & Company. (Year: 2018).*

*Primary Examiner* — Charles Guiliano
*Assistant Examiner* — Letoria G Knight
(74) *Attorney, Agent, or Firm* — Banner & Witcoff, Ltd.

(57) ABSTRACT

Systems and methods for task distribution and tracking in accordance with embodiments of the invention are disclosed. In one embodiment of the invention, a method includes obtaining, by a task tracking server system, damage data indicating damage to a component of a rail car, determining, by the task tracking server system, a location of the damage on the component, determining, by the task tracking server system, task data based on the indicated damage and the component, wherein the task data indicates a repair to the component to correct the indicated damage, obtaining, by the task tracking server system and from a third-party database, ownership data indicating a responsible party for the component and a responsible party for the rail car, and generating, by the task tracking server system, a work order including the damage data and the task data.

20 Claims, 16 Drawing Sheets

(58) Field of Classification Search
CPC ........... G06Q 10/063114; G06Q 50/30; G06N 20/00; G06N 3/08
USPC ....... 705/7.15, 7.35, 26.4, 26.3, 304, 305, 1; 706/20
See application file for complete search history.

(56) References Cited

U.S. PATENT DOCUMENTS

| | | | |
|---|---|---|---|
| 10,569,792 B2* | 2/2020 | Fahmy | B61L 15/0081 |
| 10,922,726 B1* | 2/2021 | Nelson | G06Q 30/0283 |
| 11,144,889 B2* | 10/2021 | Li | G06T 7/001 |
| 2003/0055666 A1* | 3/2003 | Roddy | G06Q 10/06395 |
| | | | 705/305 |
| 2015/0039397 A1* | 2/2015 | Fuchs | G07C 5/008 |
| | | | 705/7.35 |
| 2016/0078695 A1* | 3/2016 | McClintic | G07C 5/0816 |
| | | | 701/29.4 |
| 2017/0221110 A1* | 8/2017 | Sullivan | G06Q 30/0278 |
| 2018/0300576 A1* | 10/2018 | Dalyac | G06N 20/00 |
| 2019/0066005 A1* | 2/2019 | Margherio | G06Q 10/0631 |
| 2019/0135318 A1* | 5/2019 | Kilaru | G07C 5/0825 |
| 2019/0176862 A1* | 6/2019 | Kumar | G06K 9/00651 |

* cited by examiner

SYSTEMS AND METHODS FOR TASK DISTRIBUTION AND TRACKING

CROSS-REFERENCE TO RELATED APPLICATIONS

The instant application claims priority to U.S. Provisional Patent Application No. 62/734,402, titled "Systems and Methods for Task Distribution and Tracking" and filed Sep. 21, 2018, the disclosure of which is hereby incorporated by reference in its entirety.

FIELD OF INVENTION

The present invention is generally related to data processing and more specifically the distribution and tracking of data across a geographically distributed network.

BACKGROUND

Rail transportation includes a variety of locomotive and rail cars that travel throughout a rail system. These locomotives and cars require regular maintenance and repair to stay in service.

SUMMARY OF THE INVENTION

Systems and methods for task distribution and tracking in accordance with embodiments of the invention are disclosed. In one embodiment of the invention, a method includes obtaining, by a task tracking server system, damage data indicating damage to a component of a rail car, determining, by the task tracking server system, a location of the damage on the component, determining, by the task tracking server system, task data based on the indicated damage and the component, wherein the task data indicates a repair to the component to correct the indicated damage, obtaining, by the task tracking server system and from a third-party database, ownership data indicating a responsible party for the component and a responsible party for the rail car, and generating, by the task tracking server system, a work order including the damage data and the task data.

In an additional embodiment of the invention, the method includes obtaining, by the task tracking server system, a geographic location of the rail car indicated in the damage data, determining, by the task tracking server system, a service center associated with the geographic location, and transmitting, by the task tracking server system, the work order to a task tracking device associated with the service center.

In another embodiment of the invention, the method includes determining, by the task tracking server system, severity data based on the damage data, wherein the severity data indicates a severity of the damage to the component, and generating the task data based on the severity data.

In yet another additional embodiment of the invention, the damage data includes image data, and the task data is determined by processing the image data using a machine classifier to generate an indication of a type of damage represented in the image data and a probabilistic likelihood that the damage to the component corresponds to the indicated type of damage.

In still another additional embodiment of the invention, the method includes determining, by the task tracking server system, that the probabilistic likelihood is below a threshold value, and based on the probabilistic likelihood being below the threshold value, obtaining additional damage data for the component.

In yet still another additional embodiment of the invention, the method includes determining, by the task tracking server system, a detail source corresponding to the damage data, and obtaining the damage data from a third-party database based on the detail source.

In yet another embodiment of the invention, the method includes determining the ownership data from the third-party database based on the detail source.

Still another embodiment of the invention includes a task tracking server system including at least one processor, and memory storing instructions that, when read by the at least one processor, cause the task tracking server system to obtain damage data indicating damage to a component of a rail car, determine a location of the damage on the component, determine task data based on the indicated damage and the component, wherein the task data indicates a repair to the component to correct the indicated damage, obtain, from a third-party database, ownership data indicating a responsible party for the component and a responsible party for the rail car, and generate a work order including the damage data and the task data.

In still another embodiment of the invention, the instructions, when ready by the at least one processor, further cause the task tracking server system to obtain a geographic location of the rail car indicated in the damage data, determine a service center associated with the geographic location, and transmit the work order to a task tracking device associated with the service center.

In yet still another embodiment of the invention, the instructions, when ready by the at least one processor, further cause the task tracking server system to determine severity data based on the damage data, wherein the severity data indicates a severity of the damage to the component and generate the task data based on the severity data.

In yet another additional embodiment of the invention, the damage data includes image data and the task data is determined by processing the image data using a machine classifier to generate an indication of a type of damage represented in the image data and a probabilistic likelihood that the damage to the component corresponds to the indicated type of damage.

In still another additional embodiment of the invention, the instructions, when ready by the at least one processor, further cause the task tracking server system to determine that the probabilistic likelihood is below a threshold value and based on the probabilistic likelihood being below the threshold value, obtain additional damage data for the component.

In yet still another additional embodiment of the invention, wherein the instructions, when ready by the at least one processor, further cause the task tracking server system to determine a detail source corresponding to the damage data and obtain the damage data from a third-party database based on the detail source.

In yet another embodiment of the invention, when ready by the at least one processor, further cause the task tracking server system to determine the ownership data from the third-party database based on the detail source.

Still another embodiment of the invention includes a non-transitory machine-readable medium storing instructions that, when executed by one or more processors, cause the one or more processors to perform steps including obtaining damage data indicating damage to a component of a rail car, determining a location of the damage on the component, determining task data based on the indicated damage and the component, wherein the task data indicates a repair to the component to correct the indicated damage, obtaining ownership data indicating a responsible party for the component and a responsible party for the rail car, and generating a work order including the damage data and the task data.

In still another embodiment of the invention, the instructions further cause the one or more processors to perform steps including obtaining a geographic location of the rail car indicated in the damage data, determining a service center associated with the geographic location, and transmitting the work order to a task tracking device associated with the service center.

In yet still another embodiment of the invention, the instructions further cause the one or more processors to perform steps including determining severity data based on the damage data, wherein the severity data indicates a severity of the damage to the component, and generating the task data based on the severity data.

In yet another additional embodiment of the invention, the damage data includes image data and the task data is determined by processing the image data using a machine classifier to generate an indication of a type of damage represented in the image data and a probabilistic likelihood that the damage to the component corresponds to the indicated type of damage.

In still another additional embodiment of the invention, the instructions further cause the one or more processors to perform steps including determining that the probabilistic likelihood is below a threshold value and based on the probabilistic likelihood being below the threshold value, obtaining additional damage data for the component.

In yet still another additional embodiment of the invention, the instructions further cause the one or more processors to perform steps including determining a detail source corresponding to the damage data, and obtaining the damage data from a third-party database based on the detail source.

Other objects, advantages and novel features, and further scope of applicability of the present invention can be set forth in part in the detailed description to follow, and in part can become apparent to those skilled in the art upon examination of the following, or can be learned by practice of the invention. The objects and advantages of the invention can be realized and attained by means of the instrumentalities and combinations particularly pointed out in the claims.

BRIEF DESCRIPTION OF THE DRAWINGS

The description can be more fully understood with reference to the following figures, which are presented as exemplary embodiments of the invention and should not be construed as a complete recitation of the scope of the invention, wherein:

FIGS. 3-12 are screenshots of user interfaces in accordance with embodiments of the invention;

DETAILED DESCRIPTION

Figure 1:
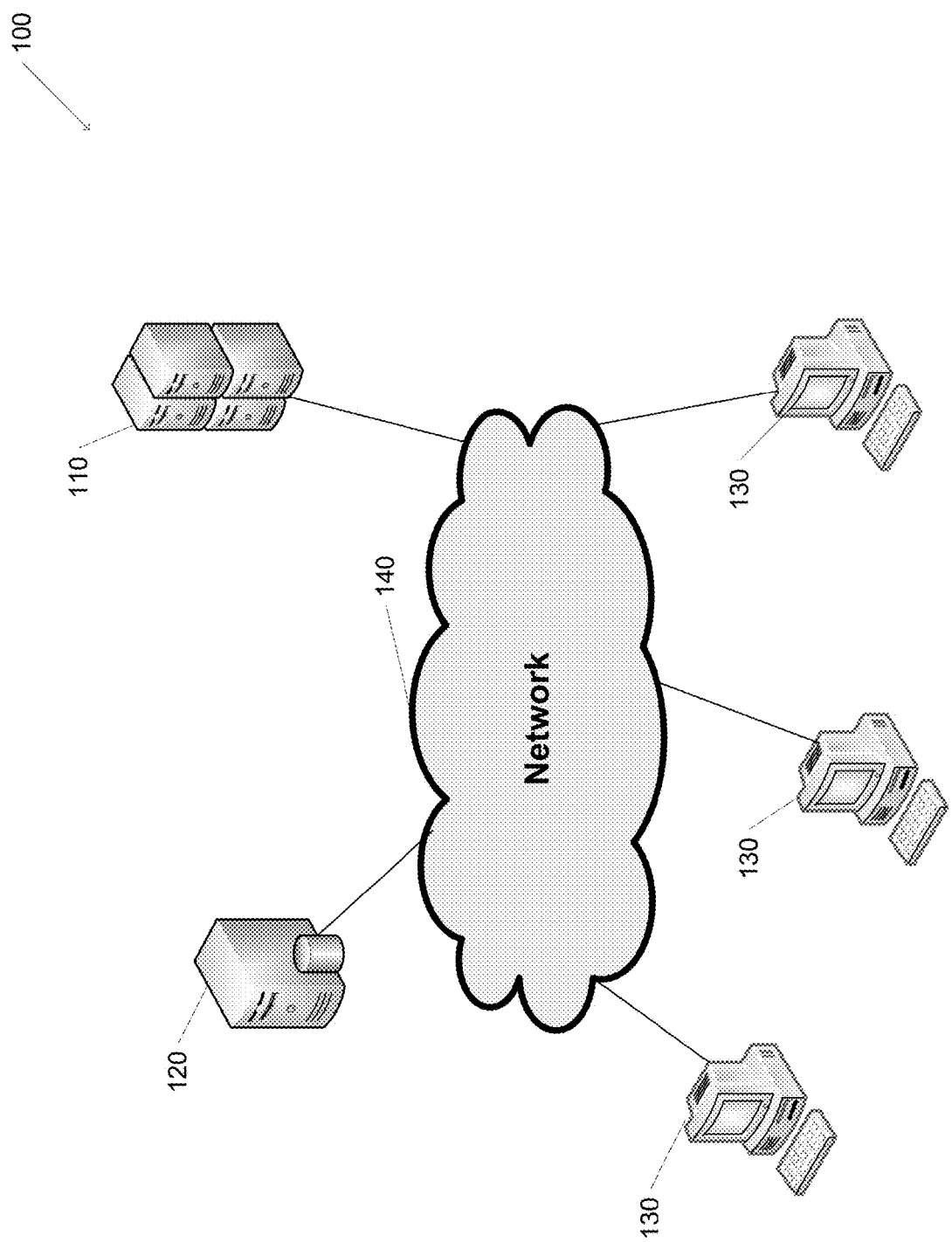
FIG. 1 is a conceptual illustration of a task tracking system in accordance with an embodiment of the invention.

Turning now to the drawings, systems and methods for task distribution and tracking in accordance with embodiments of the invention are disclosed. The maintenance and repair of rail cars can include having services performed by one of a variety of geographically distributed service centers that is proximate to the rail car at the time the service is called for. Rail cars can also include a variety of components, such as a flat and a rack, that are owned and/or maintained by different entities. For example, a flat (e.g. the wheels and underlying frame of the rail car) can be owned by a first entity while the rack (e.g. the portion of the rail car carrying cargo and attached to the underlying frame) is owned by a second entity. Data describing the rail cars and/or the ownership interests in particular rails cars is stored using a variety of systems, each providing its own interface and access to the rail car data. Additionally, each service center can have its own work order and invoice formats and requirements. The multitude of differing requirements and data sources leads to difficulties in obtaining the data necessary to determine appropriate repairs and/or maintenance to be performed to a rail car, determining liability for the appropriate repairs and/or maintenance, and obtaining the appropriate repairs and/or maintenance.

Task tracking systems in accordance with embodiments of the invention can automatically obtain data regarding a rail car and provide a unified interface for accessing and modifying a variety of data for rail cars, work orders, and invoices. In a variety of embodiments, estimates and/or invoices provided by a task tracking device can be processed using data obtained from a third-party database to determine ownership interests in a particular rail car. Damage estimates can be provided and automatically audited based on damage data describing the damage included with the damage estimate. In many embodiments, task tracking system include using an imaging device to automatically capture image data indicating damage to specific portions of a rail car and/or repairs to the specific portions of the rail car to confirm that any repairs have been successfully completed. Task tracking systems can also provide a variety of user interfaces that transform data obtained from a variety of data sources and dynamically produce a multi-source hybrid user interface that allows the viewing and modification of data provided by the variety of data sources. This data can include, but is not limited to, estimates, invoices, and ownership information for a particular rail car. In a variety of embodiments, information can be obtained from and/or stored using a standardized file format, allowing for the efficient storage and transfer of data from multiple data sources. On completion of a repair, invoices can be automatically obtained and validated based on the previously provided estimates and data obtained from the third-party databases. The provided user interfaces can also provide for the automatic allocation of liability based on the third-party ownership data. The data viewable and/or editable on a particular user interface can be based on a security role associated with the devices accessing the data.

Task tracking systems can maintain data describing a look and feel for each service center. On interaction with the user interface, task tracking system can provide information obtained from a variety of systems and third-party databases in a consistent format determined based on the look and feel for a particular service center. In a number of embodiments, the look and feel for a service center can include any elements related to the visual appearance and/or user interface conveying an overall appearance of the user interface, such as logos, colors, fonts, the layout of data, navigation elements, and/or any other user interface element. The look and feel of a service center can be stored by receiving an identification of an example user interface of the service center. The look and feel elements of the user interface can be automatically identified and stored for future use in generating user interfaces. The content of a user interface can be selected based upon a contextual analysis of the data being presented in the user interface and the look and feel for the particular service center.

Task Tracking Systems

Task tracking systems in accordance with embodiments of the invention can distribute sets of tasks to a variety of devices and track the status of those tasks. A conceptual illustration of a task distribution and tracking system in accordance with an embodiment of the invention is shown in FIG. 1. The task distribution and tracking system 100 includes task tracking server system 110 connected to third-party database 120 and one or more task tracking devices 130 via network 140. In many embodiments, the task tracking server system 110 and/or third-party database 120 are implemented using a single server. In a variety of embodiments, task tracking server system 110 is implemented using a plurality of servers. In many embodiments, task tracking devices 130 are implemented utilizing task tracking server system 110. Network 140 can be one or more of a variety of networks, including, but not limited to, wide-area networks, local area networks, and/or the Internet as appropriate to the requirements of specific applications in accordance with embodiments of the invention.

Task tracking server system 110 can obtain and store a variety of data via third-party database 120. Third-party database 120 can obtain source data from any of a variety of sources and any of a variety of providers of source data as appropriate to the requirements of specific applications in accordance with embodiments of the invention. In a variety of embodiments, third-party database 120 includes one or more references (such as a uniform resource locator) to data that is stored in a distributed fashion. Task tracking server system 110 can distribute tasks to one or more task tracking devices 130. Task tracking devices 130 can generate updates to the assigned tasks and provide the updated data to the task tracking server system 110 and/or third-party database 120.

Task tracking systems in accordance with embodiments of the invention are described above with respect to FIG. 1; however, it should be appreciated that any of a number of variations can be utilized in accordance with embodiments of the invention. In several embodiments, task tracking server systems, databases, and/or task tracking devices provide an interface, such as an application programming interface (API) or web service, to transmit and receive some or all of the data to third-party systems for further processing. Access to the interface can be open and/or secured using any of a variety of techniques, such as by using client authorization keys, as appropriate to the requirements of specific applications of the invention.

Task Tracking Devices and Server Systems

Figure 2A:
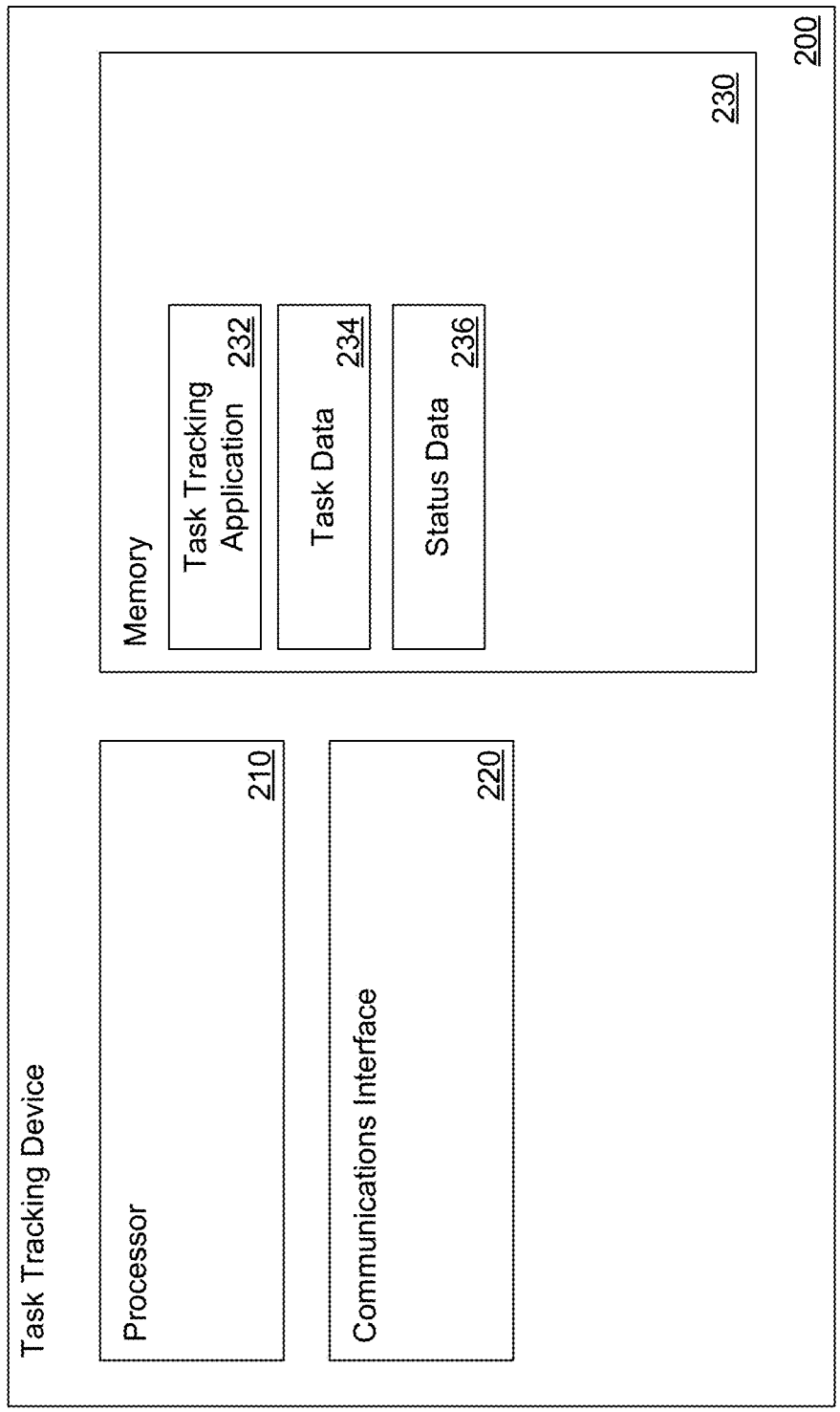
FIG. 2A is a conceptual illustration of task tracking device in accordance with an embodiment of the invention.

Task tracking systems in accordance with embodiments of the invention include a variety of devices for distribution and tracking tasks. A conceptual illustration of a task tracking device in accordance with an embodiment of the invention is shown in FIG. 2A. The task tracking device 200 includes a processor 210 in communication with memory 230. The task tracking device 200 can also include one or more communication interfaces 220 capable of sending and receiving data. In a number of embodiments, the communication interface 220 is in communication with the processor 210 and/or the memory 230. In several embodiments, the memory 230 is any form of storage storing a variety of data, including, but not limited to, a task tracking application 232, task data 234, and status data 236. In many embodiments, task tracking application 232, task data 234, and/or status data 236 are stored using an external server system and received by the task tracking device 200 using the communications interface 220. The processor 210 can be directed, by the task tracking application 232, to perform a variety of task tracking processes described herein.

Figure 2B:
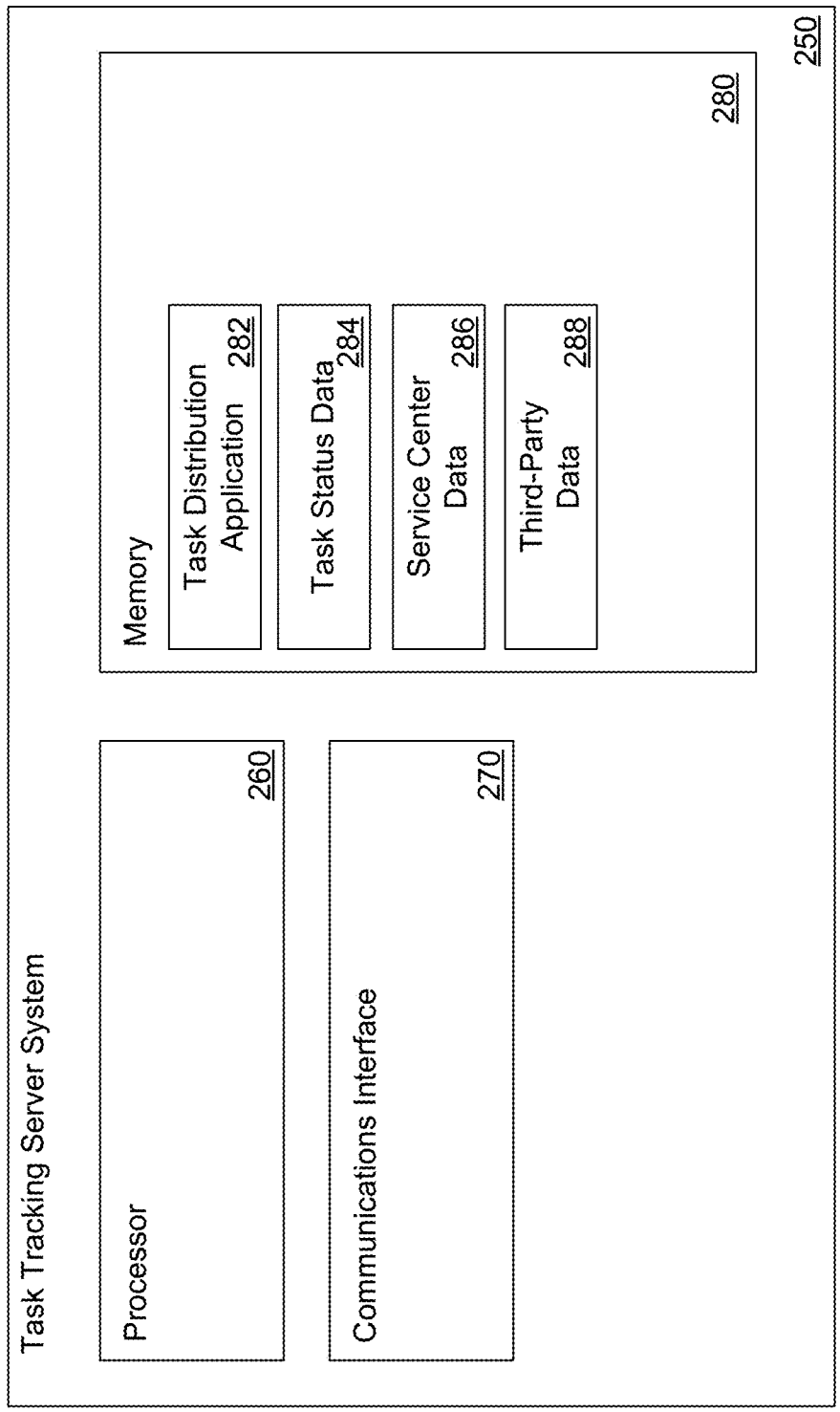
FIG. 2B is a conceptual illustration of a task tracking server system in accordance with an embodiment of the invention.

A conceptual illustration of a task tracking server system in accordance with an embodiment of the invention is shown in FIG. 2B. The task tracking server system 250 includes a processor 260 in communication with memory 280. The task tracking server system 250 can also include one or more communications interfaces 270 capable of sending and receiving data with a variety of devices, such as with third-party databases and task tracking devices. In a number of embodiments, the communication interface 270 is in communication with the processor 260 and/or the memory 280. In several embodiments, the memory 280 is any form of storage storing a variety of data, including, but not limited to, a task distribution application 282, task status data 284, service center data 286, and third-party data 288. In many embodiments, the task distribution application 282, task status data 284, service center data 286, and/or third-party data 288 are stored using an external server system and received by the task tracking server system 250 using the communications interface 270. The processor 260 can be directed, by the task distribution application 282, to perform a variety of task tracking processes described herein.

Although specific architectures for task tracking devices and task tracking server systems in accordance with embodiments of the invention are conceptually illustrated in FIGS. 2A-B, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed using transistors, that store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

User Interfaces

Task tracking processes can include distributing and tracking a variety of tasks related to the servicing of rail cars. Many task tracking processes include obtaining data from a variety of third-party databases and generating user interfaces that allow the viewing and editing of the data. The user interfaces can be dynamically generated based on interface templates that are dynamically determined for a particular service center at which the user interface is being displayed. In many embodiments, the format of the displayed information and/or actions that can be performed on the displayed information are based on permission data associated with the task tracking device (or any other computing device) displaying the user interface. In several embodiments, the edited data can be transmitted and stored by the third-party databases.

A variety of task tracking processes include viewing, editing, and maintaining contracts with a variety of service centers. A contracts user interface allows users to view, maintain, and/or edit the contracts that determine which service centers are allowed to submit billing and/or perform work for given rail cars. A variety of security measures and/or controls can be used to control the viewing and/or editing of contracts, such as on a per-account, per-service center, and/or per-contract basis. These contracts can be used to validate whether or not a service center is allowed to submit billing for a given rail car. In the event billing is submitted for a rail car not specified in the contract, the billing can be rejected. In many embodiments, contracts do not overlap between service centers. A contract can have a start date and an end date. In a variety of embodiments, if a contract is defined to be valid through a date over a threshold amount (e.g. more than 100 years in the future) or the end date is unspecified, the contract can be validated to cause the end date to be set to a valid date before a new contract can be created. Contracts can include a variety of data, such as labor rates, thresholds, a description of the work to be done, the items to be worked on, and/or a variety of other data. In several embodiments, terminating a contract sets the effective end date as of the date of termination. Contracts can be adjusted as needed, but not deleted, as appropriate to the requirements of specific applications of embodiments of the invention. In a variety of embodiments, work orders have an effective start date and/or an effective end date. The effective start and end date can be based on repair date and/or estimate date, and, in a number of embodiments, the effective start date and effective end date of the work order is within the start date and end date of the contract. The contract status (active, inactive, etc.) can be used to determine which contract is currently valid on a given date. A contract ending prior to or before a particular date can be considered inactive as of the particular date.

Figure 3:
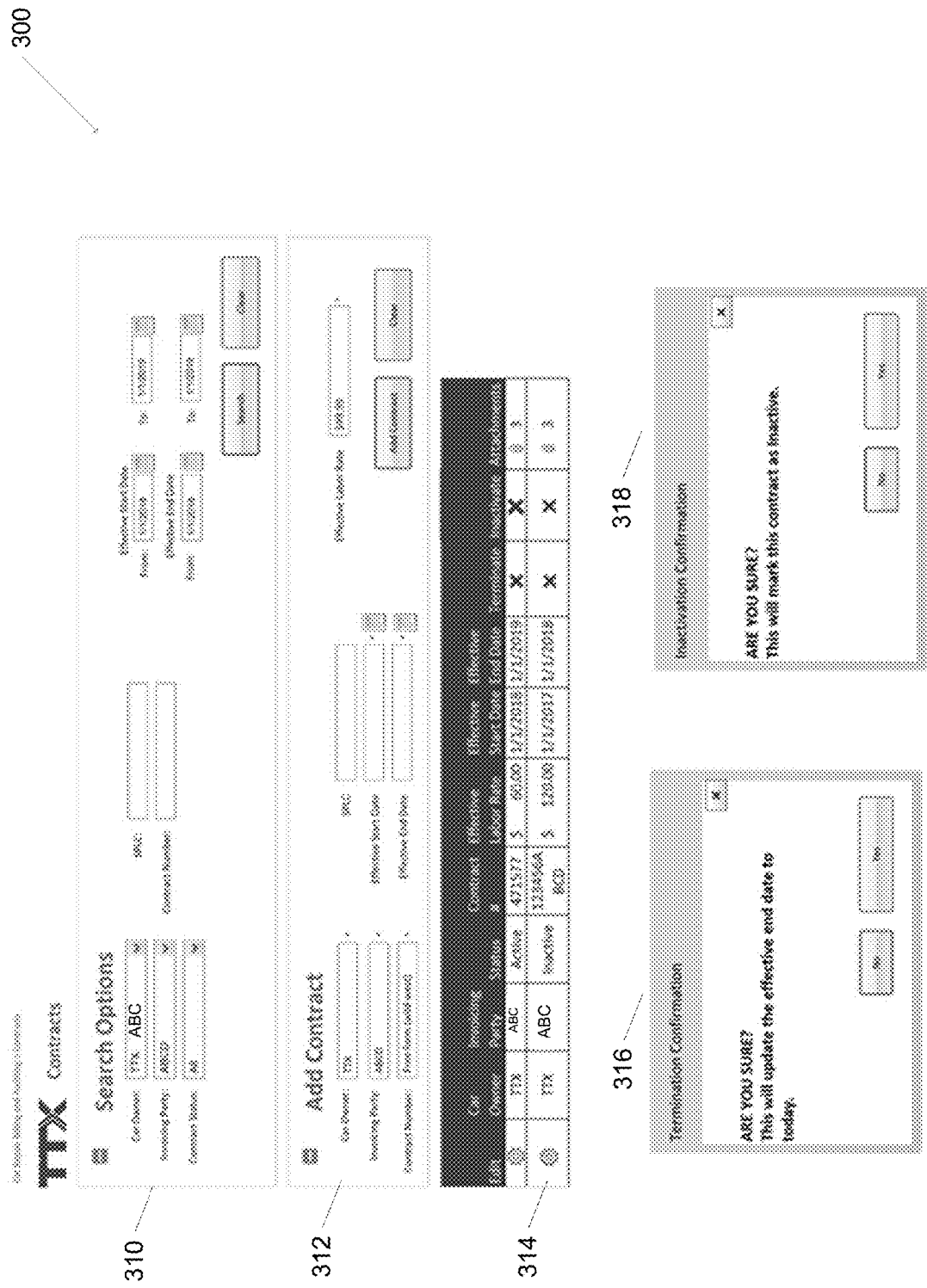

A screenshot of a user interface for interacting with contracts in accordance with an embodiment of the invention is shown in FIG. 3. The user interface 300 includes a set of search options 310, an add contract function 312, and a set of existing contracts 314. The set of search options 310 can include one or more rail car owners, an invoicing party, a standard point location code, a contract status, a contract number, a start date, and/or an end date. In several embodiments, the rail car owner can be obtained from a third-party database indicating various components of a rail car and relative ownerships interests in the rail car based on the components. The invoicing party can include the service center where a rail car is being serviced. A stand point location code can include an alphanumeric string indicating a state, province, or territory, a county, a city or municipal region, and a specific location within the city or municipal region. A contract status can indicate if a contract is pending, active, or lapsed. The contract number can be a unique identifier for a contract and/or a partial identifier which corresponds to multiple contracts. The start date and/or end date can be a specific date and/or a range of dates. The add contract function can allow for the creation of new contracts. A rail car owner, invoicing party, contract number, standard point location code, start date, end date, labor rate, and/or any other relevant data can be defined in the creation of a contract. In a number of embodiments, creating a new contract causes contract data, including the specified data, to be transmitted to and stored by a third-party database associated with the invoicing party (e.g. service center) identified in the new contract data. The set of existing contracts can include any information regarding existing contracts, along with options to terminate and/or disable existing contracts. Terminating and/or disabling contracts can cause confirmation boxes 316 (for contract termination) and 318 (for setting a contract to inactive) requiring a user to confirm that a contract should be terminated and/or disabled before modifying the existing contract. In several embodiments, terminating and/or disabling a contract causes contract data stored using a third-party database associated with a service center identified in the contract to be updated to reflect the contract's updated status.

Many task tracking processes include creating and editing estimates. A create/edit estimates user interface allows a service center to review and/or create estimates. Header information can be provided and validated before being saved. In a variety of embodiments, the header information cannot be edited once saved. The estimate can also include a variety of line items indicating particular repairs to damage and/or maintenance on a rail car. In several embodiments, line items can be automatically determined by processing image data indicating damage to a particular portion of the rail car. A line item can also indicate a job code. The job code can be automatically validated based on the rail car so that only valid jobs can be estimated for the repair and/or maintenance of the rail car. Some or all of the data indicated in the line item can be automatically generated based on a job code. In many embodiments, the automatically generated data is editable. For rail cars with a wheelset assembly, a wheelset job code can be indicated. A user interface can include a wheel narrative dropdown to obtain information regarding the wheelset. Estimates can be validated. The validations can be automatically executed on the task tracking device and/or on a remote system, such as a task tracking server system. Any errors or validation failures can be displayed and/or corrected within the user interface. In a variety of embodiments, the errors appear as exceptions to individual lines. If there is a header exception, it can appear as a line 0 exception. The validation procedure can continue until there are no file acceptance or core business rule validations. In a variety of embodiments, the validated estimate data can be transmitted and stored using a third-party database associated with the service center. Once those validations have passed and the estimate is in the review work queue, the estimate user interface can become read-only to the service center. In order to make modifications, the estimate can be rejected, information can be requested from an agent and/or rail car owner, and/or approved by the rail car owner with no invoice submitted for the car, detail source, and same work order number. In several embodiments, it is not possible to create an invoice from the estimate in the estimate user interface. In order to create the invoice, a user can navigate to approved estimate work queue user interface, select the estimate, and create an invoice. In a variety of embodiments, attachments may be added to an estimate and/or attachment added to an estimate may be viewed at any time. The viewing and/or adding of attachments can be based on security information associated with a service center. For example, a service center may only be able to see attachments for an estimate that have been uploaded or have been selected for viewing by an agent, despite being able to access all of the data associated with the estimate.

Figure 4:
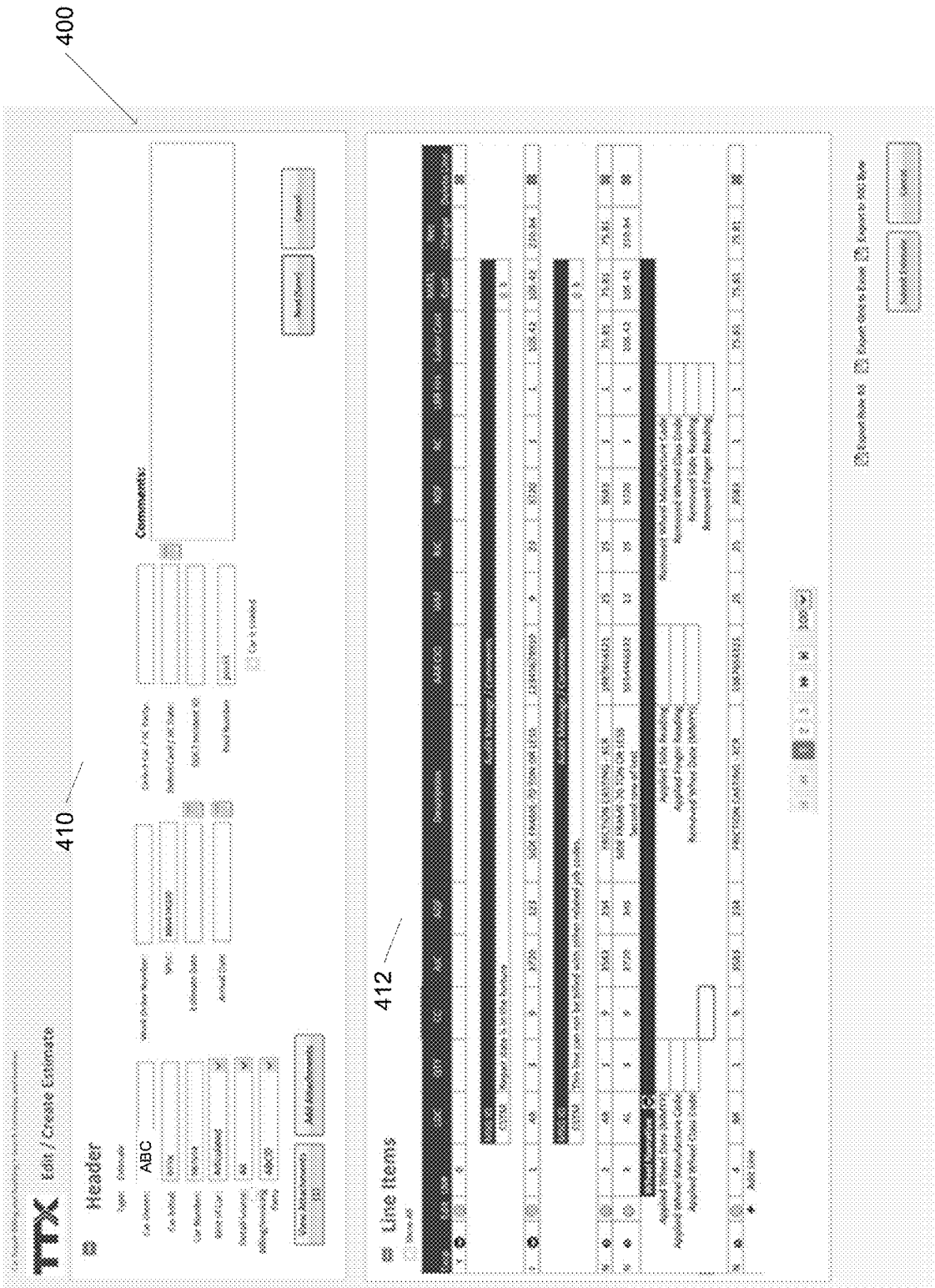

A screenshot of a user interface for interacting with estimate tasks in accordance with an embodiment of the invention is shown in FIG. 4. The user interface 400 can include a set of header data 410 for an estimate. The header data 410 can include one or more rail car owners, a rail car initial, a rail car number, a rail car type, a detail source, an invoicing party, a work order number, a standard point location code, an estimate creation date, an arrival date, a defect card identifier, a defect card date, an incident identifier, a pool number, a car loaded flag, and/or comment data. In several embodiments, the rail car owner, rail car initial, rail care number, and/or rail car type can be obtained from a third-party database indicating various components of a rail car and relative ownerships interests in the rail car based on the components. The invoicing party can include the service center where a rail car is being serviced. The work order number can include an identifier associated with the estimate for the identified rail car. A stand point location code can include an alphanumeric string indicating a state, province, or territory, a county, a city or municipal region, and a specific location within the city or municipal region. The estimate date can indicate the date on which the estimate was created. The arrival date can indicate when the rail car was received by the service center. The defect card identifier can be used to obtain data from a third-party database regarding damages or defects. The defect card date can indicate the date on which the defect card was obtained by the third-party database. The pool number can indicate a set of rail cars that are logically grouped together, such as a set of rail cars carrying cargo for a particular entity. The car loaded flag can indicate if the rail car was carrying cargo when the damage occurred and/or when the rail car was received by the service center. The comment data can include any data describing the rail car and/or damage to the rail car, including image data captured showing defects in the rail car. Any of the dates can be a specific date and/or a range of dates as appropriate.

The user interface 400 can also include a set of line items 412 for an estimate. A line item can include a line identifier, a code for who is responsible for the repair, a code for why a repair is necessary, a serial code that identifies specific components, a location of a repair and/or maintenance on the rail car, the quantity of the task needed, a task code uniquely identifying the task, a description of the task, an estimated number of hours of labor to perform the indicated task, a labor rate for the task, and a total estimated charge for performing the task. The total estimated charge can be a function of the hours of labor, the labor rate, and/or the specific task being performed. In several embodiments, when the task code indicates repairs and/or maintenance to a wheelset, a wheel narrative can be provided. The wheel narrative can include a date on which the wheels were cast, an identifier of the installed wheel manufacturer, an identifier of a class of the installed wheels, a side reading for the installed wheels, a finger reading for the installed wheels, a casting date for one or more wheels that were removed, a removed wheel manufacturer identifier, a remove wheel class code, a removed side reading, and/or a removed finger reading.

Task tracking processes can include viewing estimate details. The estimate details user interface allows viewing the full details of an estimate. In a variety of embodiments, this user interface is read only, however agents and/or rail car owners can add attachments, select exceptions, provide queries for additional information to service centers, reject the estimate, and/or approve the estimate. The estimate detail user interface can also incorporate a variety of data obtained from third-party databases in a format specific to the task tracking device providing the user interface. In a variety of embodiments, the third-party data includes Railinc information obtained from a third-party database based on the car initial and/or car number provided in the estimate data. This third-party data can indicate any open incidents, early warnings, and/or other relevant data as provided by the third-party database. The estimate detail user interface can also provide a link to prior versions of an estimate, for example, if the estimate has been previously revised or corrected.

Figure 5:
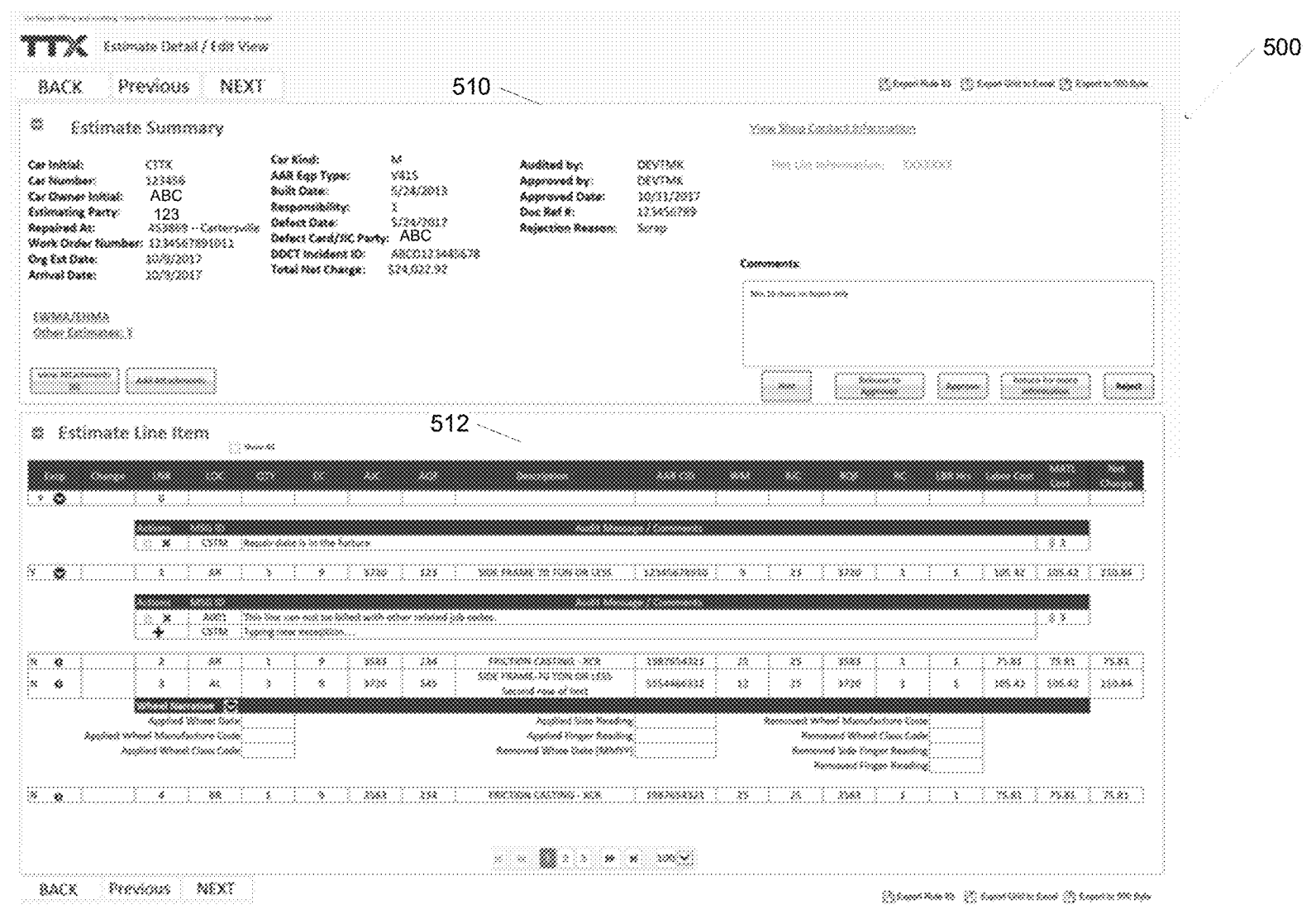

A screenshot of a user interface for interacting with estimate details in accordance with an embodiment of the invention is shown in FIG. 5. The user interface 500 includes an estimate summary 510 and estimate lines items 512. The estimate summary 510 can include any information described in an estimate, such as the data described with respect to FIG. 4. The estimate summary 510 can also indicate a car kind, an equipment type, a build date, an audit party who reviewed the estimate, an approval party who approved the estimate, an approval date on which the estimate was approved, a reference number associated with the approval, and/or a rejection reason indicating why a particular estimate was rejected. For example, an estimate can be rejected because the rail car is to be scrapped and/or taken out of service. The car kind, equipment type, and/or build date can include standardized data obtained from a third-party database, such as an Umler database, that is automatically obtained and displayed based on the car initials and/or car number. The estimate line items 512 can include any data regarding specific repairs and/or maintenance to be performed to the rail car, including a wheel narrative, as described herein.

Task tracking processes further include creating and editing invoices. A create/edit invoices user interface can allow service centers to review and create invoices. Invoices can be created from estimates already present in the system. In a variety of embodiments, in order to upload or create an invoice, an approved estimate with a matching work order number must first be created in the task tracking system. When there is a bill that can be submitted straight for invoicing, it can first be entered as an estimate. Once entered, an estimate can easily be converted into an invoice after all necessary approvals. The user interface can provide the ability to edit any existing data or add any new information to the estimate for the invoice. In a variety of embodiments, information can only be added and/or edited prior to the estimate and/or invoice being approved. When a job code is entered, context fields such as a description field can be pre-populated and/or can be editable based on information automatically obtained from a third-party database. When the job code corresponds to a wheelset job code, a wheel narrative can be created to allow the appropriate information to be added to the invoice. Once completed, the invoice can be validated. Validations can run before navigating away from this user interface and/or be executed on the task tracking device and/or on a remote system, such as a task tracking server system. Any errors or validation failures can be displayed and/or corrected within the user interface. In a variety of embodiments, the errors appear as exceptions to individual lines. If there is a header exception, it can appear as a line 0 exception. The validation procedure can continue until there are no file acceptance or core business rule validations. Once those validations have passed and the invoice is in an audit process, this user interface can become read-only to a task tracking device associated with a service center. In order to make modifications, the invoice can be rejected or sent for information by the agent or rail car owner, or approved by the rail car owner with no invoice submitted for the car, detail source, and same work order number. In several embodiments, it is not possible to create an invoice from the estimate on this user interface. In order to create the invoice, a user can go to the approved invoice work queue, select an estimate, and create the invoice. Task tracking devices associated with users can be allowed to add or view attachments at any time. Task tracking devices associated with service centers can only be able to see attachments they have uploaded or have been selected for viewing by the agent. All files can be visible to the service center, but attachments can be hidden.

Figure 6:
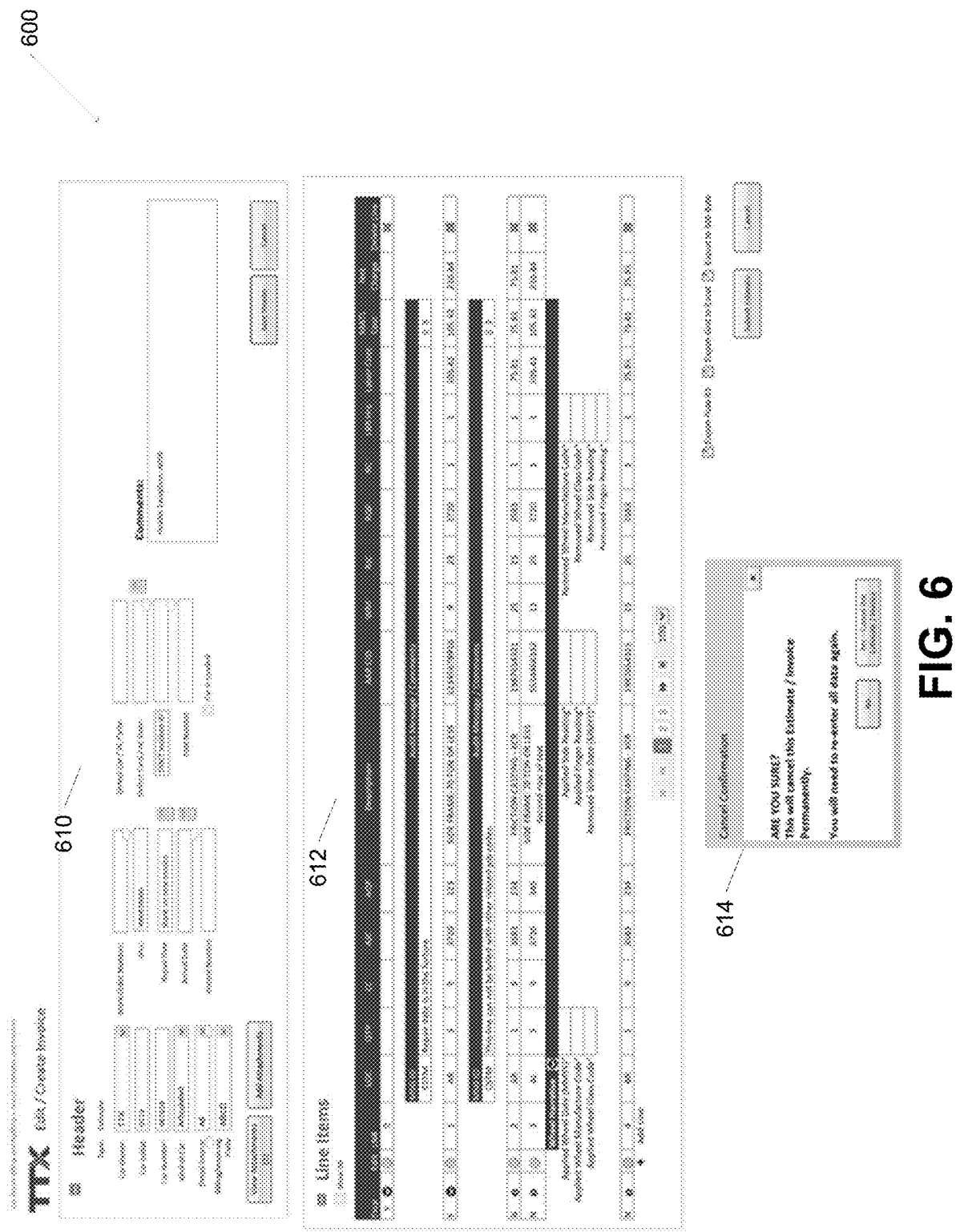

A screenshot of a user interface for interacting with invoice tasks in accordance with an embodiment of the invention is shown in FIG. 6. The user interface 600 includes header data 610 and line items 612 for a particular invoice. The header data 610 and/or line items 612 can include data for an estimate associated with the invoice being displayed using the user interface 600. Any data described herein, including estimate data described with respect to FIG. 4, can be displayed as appropriate to the requirements of specific embodiments of the invention. On selecting a cancel option, a cancel confirmation dialog 614 can be displayed. On approval of the cancel confirmation dialog 614, the invoice and associated estimate(s) can be deleted from the task tracking system, including any task tracking server systems and/or third-party databases storing the estimate data and/or invoice data.

In several embodiments, task tracking processes include viewing and editing invoice details. The invoice details user interface is designed for task tracking devices associated with agents and/or rail car owners to view the full details of an invoice. This user interface can be read only, however task tracking devices associated with agents and/or rail car owners can add attachments, return to service center for additional information, select exceptions, reject, and/or approve the invoice. This user interface can also display and/or edit information obtained from a third-party database using a consistent look and feel to data native to the task tracking system. In a variety of embodiments, the third-party data includes Railinc information obtained from a third-party database based on the car initial and/or car number provided in the invoice data. This data can inform the user of any open incidents, early warnings or other relevant data. The particular portions of the invoice data displayed in this user interface can be based on security roles associated with the task tracking device providing the user interface. For example, an invoice can be for a railroad and Railinc information can be provided on the user interface. Invoice data can include a link to the last approved estimate associated with the invoice data. This estimate can include other cancelled estimates linked and any attachments or exceptions associated with the estimate. Task tracking devices associated with agents and/or rail car owners can see which lines were changed or added by the service center user compared against the approved estimate each time it is submitted to the agent/rail car owner. All system flagged exceptions in the extended business rules can appear on this user interface.

Figure 7:
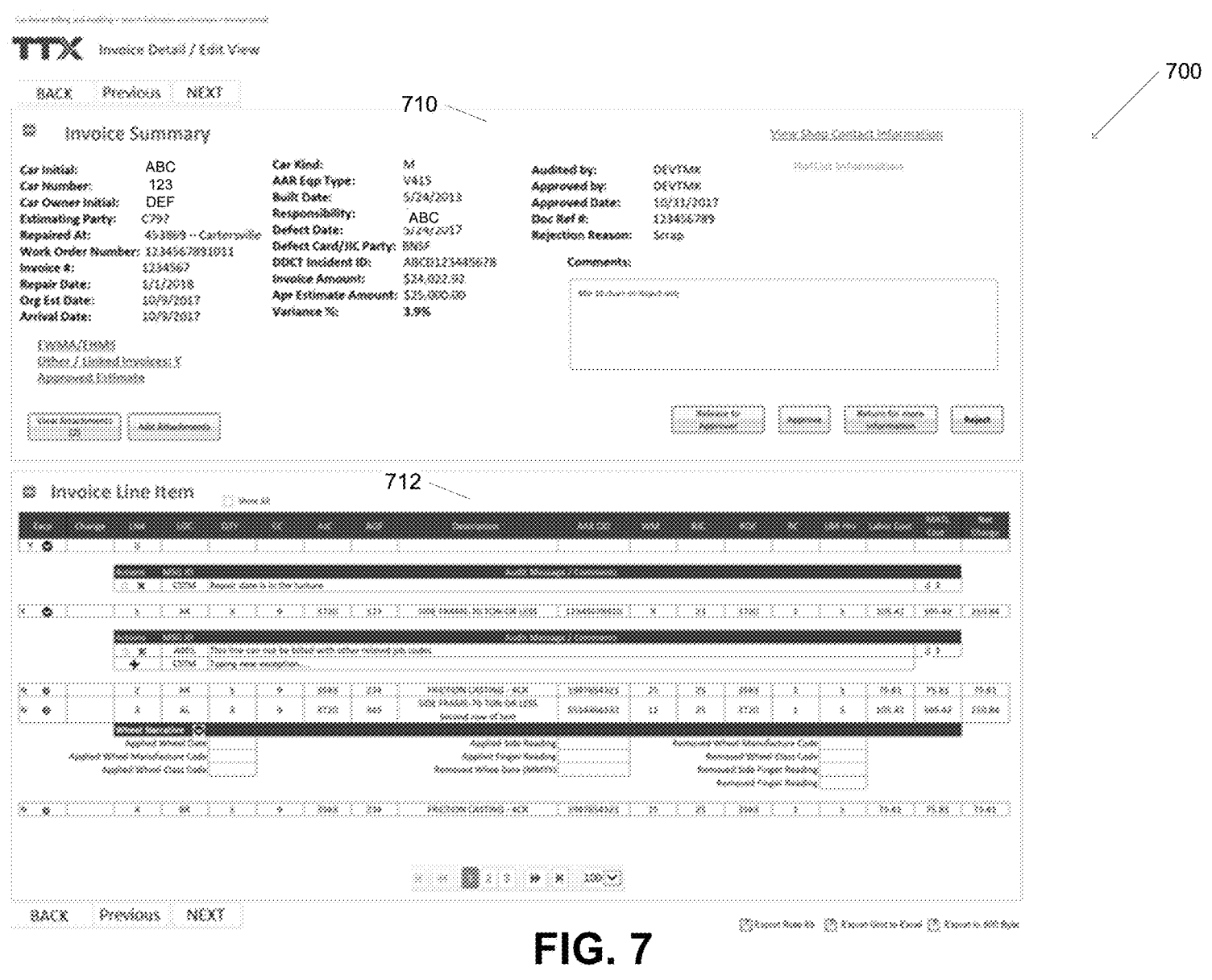

A screenshot of a user interface for viewing invoice details in accordance with an embodiment of the invention is shown in FIG. 7. The user interface 700 includes an invoice summary 710 and invoice line items 712. The invoice summary 710 can include any data associated with an invoice and/or associated estimates as described herein. The invoice summary 710 can also include an invoice amount indicating the amount billed for the tasks performed, an estimate amount indicating the estimate for the tasks performed and variance calculated based on the amount actually invoiced and the estimate.

Many task tracking processes include uploading files. A file upload user interface allows task tracking devices associated with service centers to upload formatted 500-byte files. In a number of embodiments, only task tracking devices associated with service center users and administrations can have access to this user interface. After uploading one or more 500-byte files, the file transfer results of the upload can be displayed. The uploaded files may be processed by and the transfer results can include the processing status. If a user navigates away from the user interface, the file upload can continue and an email (or other notification) can be generated to one or more contact addresses designated as a contact for a service center associated with the task tracking device associated with the service center. The admin can be responsible for maintaining the file upload description and hyperlinks on this user interface.

Figure 8:
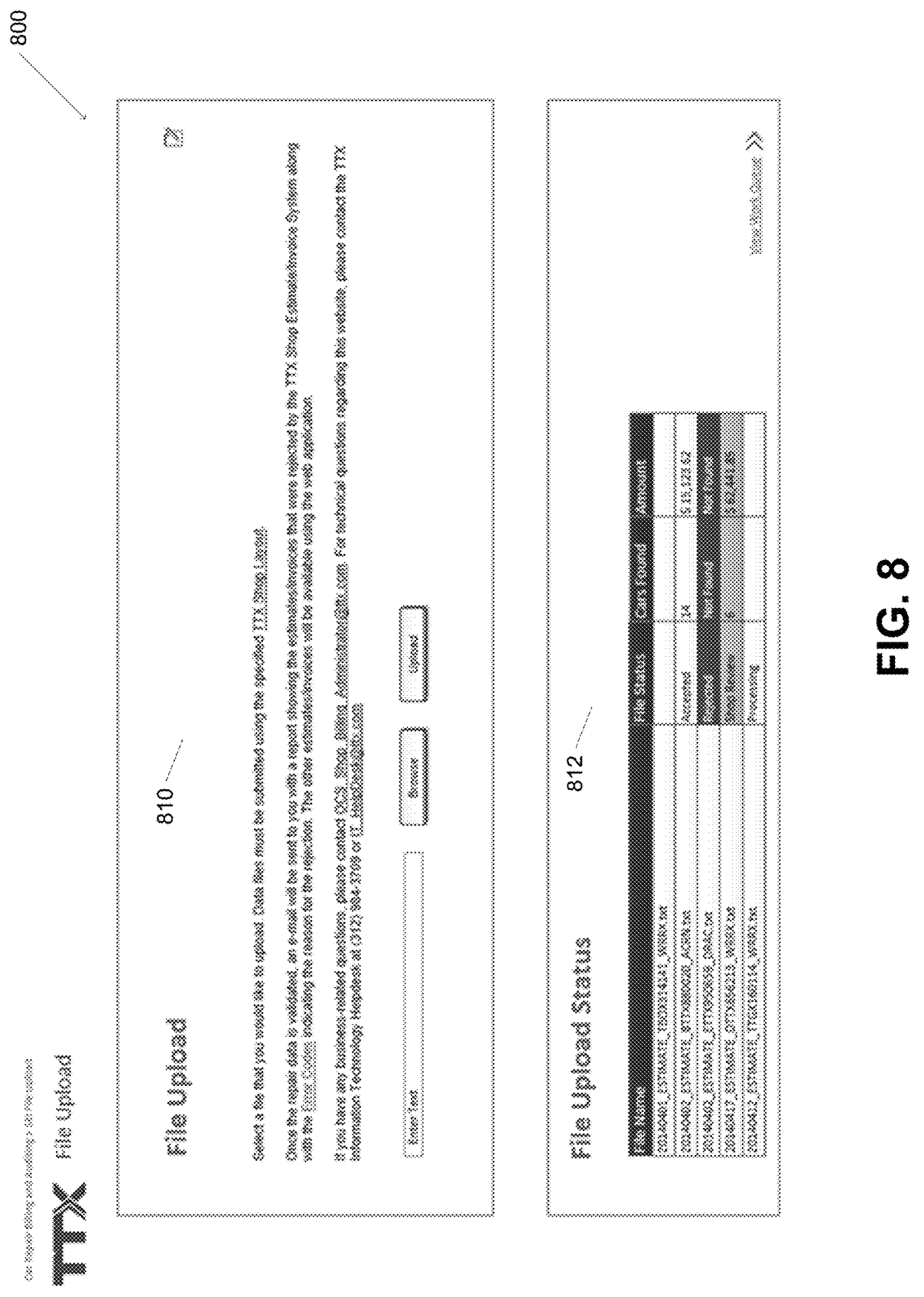

A screenshot of a user interface for uploading files in accordance with an embodiment of the invention is shown in FIG. 8. The user interface 800 includes a file upload dialog 810 and a file upload status 812. The file upload dialog 800 can provide a variety of data related to the upload of the 500-byte files, an option to select one or more 500-byte files for upload, and an option to initiate transfer of the selected files. The file upload status 512 can indicate 500-byte files previously selected for upload, the status of the file upload, an indication of the number of rail cars indicated in the uploaded files, and/or an invoice and/or estimate amount for the rail cars indicated in the uploaded files. In several embodiments, the status of the file uploaded is updated as the file is uploaded, processed, reviewed, rejected, and/or approved. The number of cars found and/or amounts can be determined during the uploaded file processing and the user interface can be updated as the relevant information is calculated during processing of the appropriate file.

Task tracking processes can also include viewing standardized data, such as Railinc data. The Railinc detail user interface can appear when an agent/owner is looking at the details of a car in the estimate/invoice search user interfaces. This user interface allows task tracking devices associated with auditors to obtain and/or edit information from a third-party database providing Railinc data without having to login and search on each car number. In a variety of embodiments, the Railinc data is automatically updated.

Figure 9:
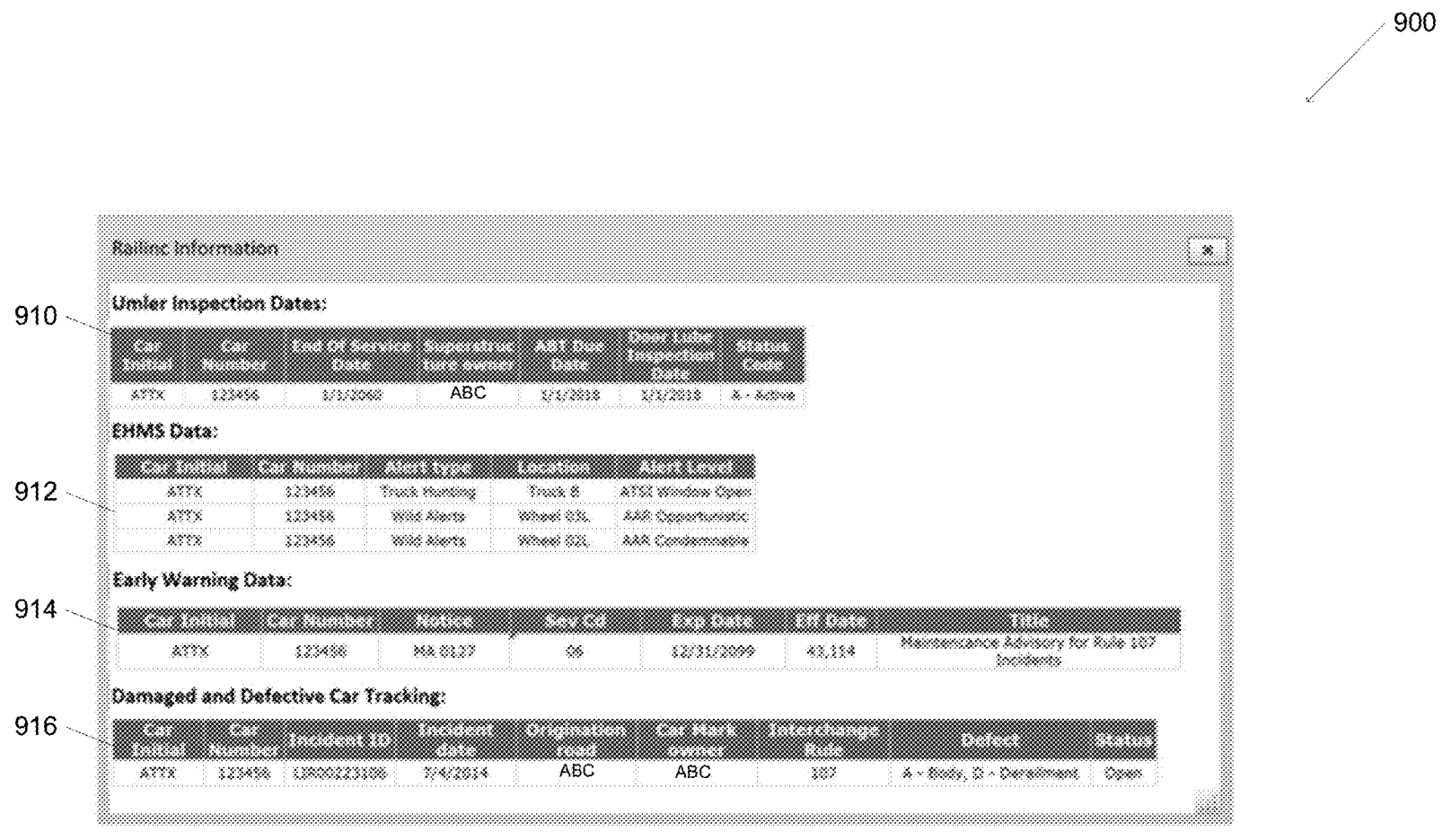

A screenshot of a user interface for viewing Railinc data in accordance with an embodiment of the invention is shown in FIG. 9. The user interface 900 includes inspection data 910, equipment health data 912, early warning data 914, and damaged and defective car tracking data 916. The inspection dates 910 can include a standardized set of inspection dates based on specific equipment installed on a rail car. In several embodiments, the dates and related codes and provided in a standardized format, such as Umler, by a third-party database. The equipment health data 912 can include a variety of data automatically generated by one or more pieces of equipment installed on a rail car, a location of the piece of equipment, and an indication of the severity of the health of the piece of equipment. The early warning data 914 can indicate potential issues that may occur with a rail car. In several embodiments, the early warning data is automatically generated based on the specific equipment present on a rail car and a historical likelihood of a particular event occurring to a piece of equipment based on the usage history of the rail car. The early warning data can be automatically generated by a task tracking server system and/or obtained from a third-party database as appropriate to the requirements of specific applications of embodiments of the invention. The damaged and defective car tracking data can indicate any defects to any portion of a rail car, the date on which the defect occurred, a geographic location at which the defect was introduced to the rail car, the owner of the car, an incident identifier, and the status of any repair being done to the rail car.

Task tracking processes can also include searching for data. The search user interface can be used by task tracking devices associated with service center, agents, and/or rail car owners. This user interface allows for a refined search of all estimates and invoices within the task tracking system. Data can be visible for any historic period once access has been granted to the data. In a number of embodiments, task tracking devices associated with service centers can only see estimates and/or invoices associated with the service center itself or other service centers in which the service center have been granted access in the estimating party drop down. A variety of security roles associated with task tracking devices can be used to determine access to filters used to search for data. Any of a variety of security roles, such as agents, rail car owners, and service centers, can be utilized. However, it should be noted that any of a variety of security roles can be utilized as appropriate to the requirements of specific applications of embodiments of the invention. Task tracking devices associated with agents, rail car owners, and service centers can be limited to searching for the rail car owners to which the task tracking device has a security role granting access. In several embodiments, no direct actions can be taken from this user interface; however, a hyperlink can be provided which redirects the user interface to the estimate user interface. In a number of embodiments, the hyperlink causes estimate user interface to be displayed using look and feel elements utilized in the search user interface. Users can be directed to different user interfaces depending on their actions and/or security roles. For example, task tracking devices associated with service centers can be directed to the edit/create user interface, while task tracking devices associated with agents and/or rail car owners can be directed to the estimate details user interface.

Figure 10:
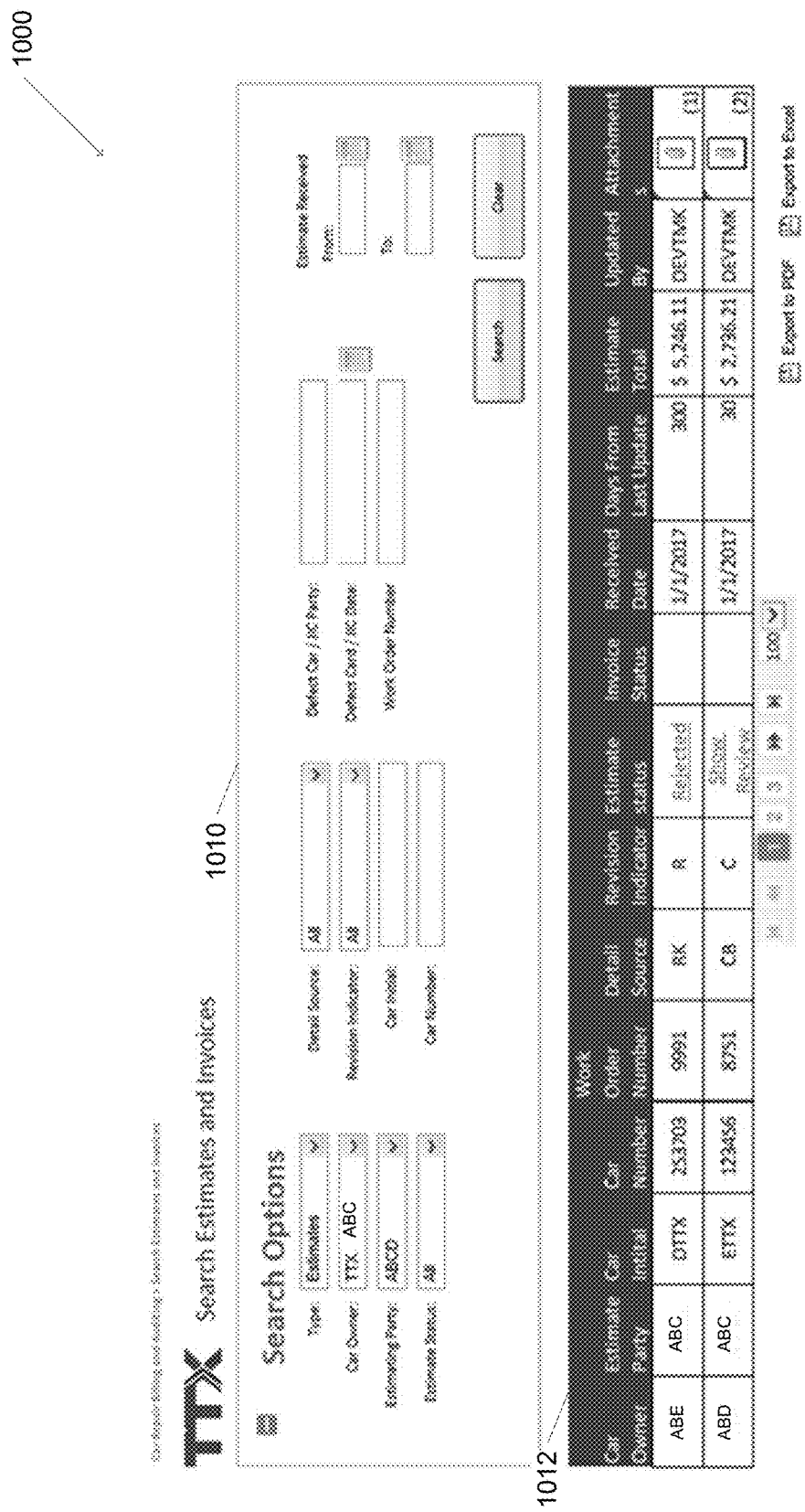
Figure 11:
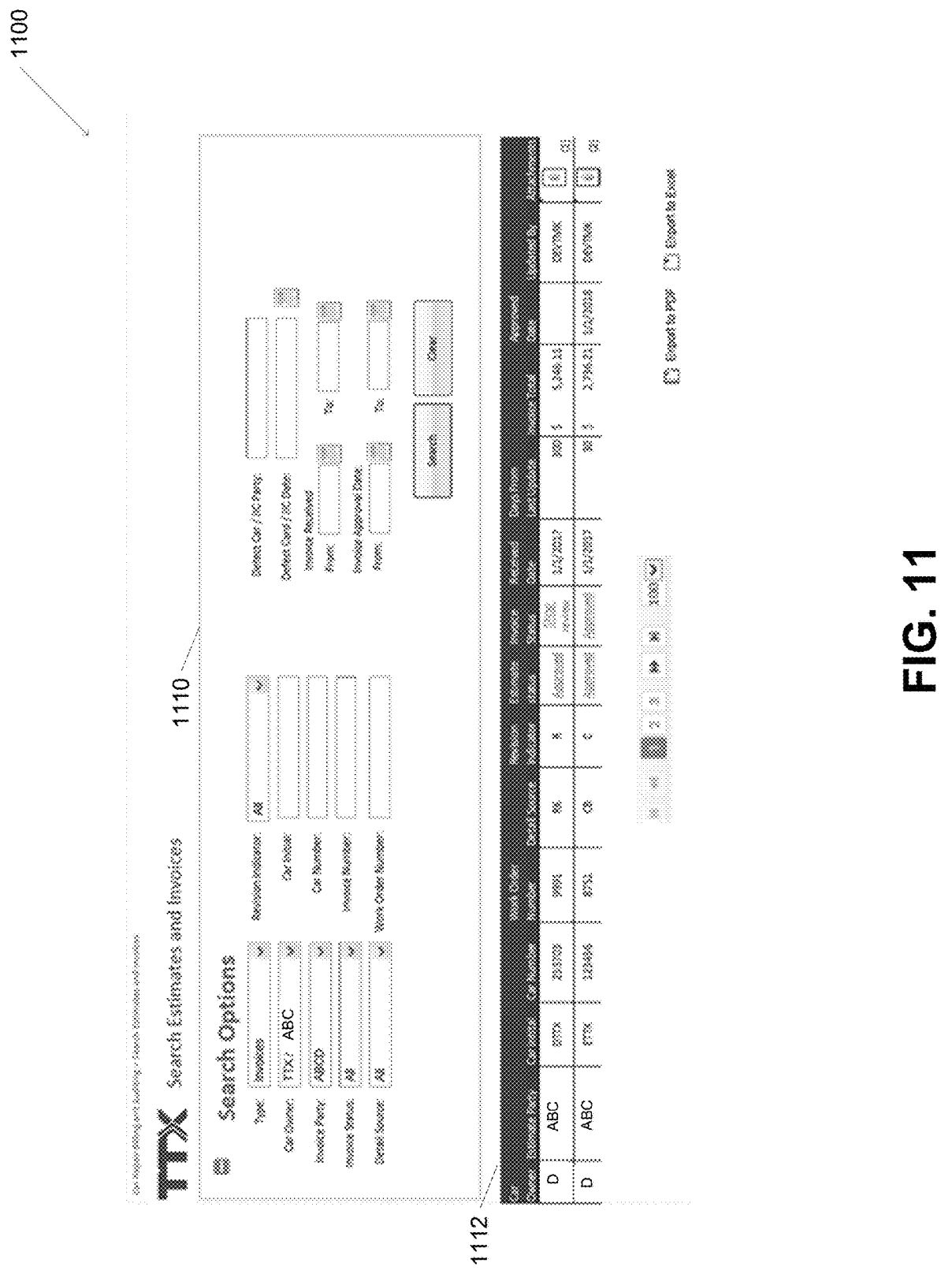

Screenshots of user interfaces for searching estimates and invoices in accordance with embodiments of the invention are shown in FIGS. 10 and 11. The user interface 1000, shown in FIG. 10, includes search options 1010 and search results 1012. The search options 1010 include a search type of Estimate, a car owner, an estimating party, an estimate status, a detail source, a revision indicator, a car initial, a car number, a defect car party, a defect card date, a work order number, and an estimate date range. The search results 1012 can include any estimates stored using any third-party databases and/or within the task tracking system which have some or all of the details of the estimate matching some or all of the data entered into the search options 1010. The search results 1012 can include hyperlinks to an estimate-related user interface capable of showing additional details regarding a specific estimate and/or allowing for editing of the estimate. The specific user interface linked to can be dynamically determined based on the security role associated with the task tracking device performing the search, the status of the estimate, and/or any of a variety of other criteria as appropriate to the requirements of specific applications of the invention.

The user interface 1100, shown in FIG. 11, includes search options 1110 and search results 1112. The search options 1110 include a search type of Invoice, a car owner, an invoice party, an invoice status, a detail source, a revision indicator, a car initial, a car number, an invoice number, a defect car party, a defect card date, a work order number, an invoice received date range, and an invoice approval date range. The search results 1112 can include any invoices stored using any third-party databases and/or within the task tracking system which have some or all of the details of the invoice matching some or all of the data entered into the search options 1110. The search results 1112 can include hyperlinks to an invoice-related user interface capable of showing additional details regarding a specific invoice and/or allowing for editing of the invoice. The specific user interface linked to can be dynamically determined based on the security role associated with the task tracking device performing the search, the status of the invoice, and/or any of a variety of other criteria as appropriate to the requirements of specific applications of the invention.

Task tracking processes can also include viewing and editing work queues. A work queue user interface can be the primary user interface and showing current actionable items for a particular user. Task tracking devices associated with agents, rail car owners, and service centers can have access to the same work queue, but the data displayed can be based on the security role associated with the task tracking device. Service centers can submit estimates and convert an approved estimate into an invoice. In several embodiments, task tracking devices associated with agents and/or rail car owners can approve estimates or invoices. In many embodiments, task tracking devices associated with rail car owners and/or agents can set the status of an estimate to hold. In a variety of embodiments, a work order can include a two-step approval process. For example, if a task tracking device is associated with an agent, the task tracking device can be required to approve estimates and invoices before a task tracking device associated with a rail car owner indicated in the estimate is granted the ability to approve the estimate. When there is a no agent associated with an estimate, the estimate can be presented directly to the task tracking device associated with the rail car owner. Search functions can be provided as described herein that allow refinements and searching on multiple attributes of an estimate and/or invoice. For example, search parameters indicating a car initial of "DTTX" and a revision indicator of "R" can return a set of search results. The search results can be sorted one attribute at a time, for example, for attribute car number being between one and nine, and/or detail source. In many embodiments, task tracking devices are not allowed to cancel or reject estimates and/or invoices from this user interface as comments and manual review can be required before rejection or sending for more information is allowed. Links to estimate-related user interfaces and/or invoice-related user interfaces can be provided. Selected estimates or invoices can be exported to any of a variety of formats, such as but not limited to PDF (Rule 83), Excel, and/or 500-byte file formats.

Figure 12:
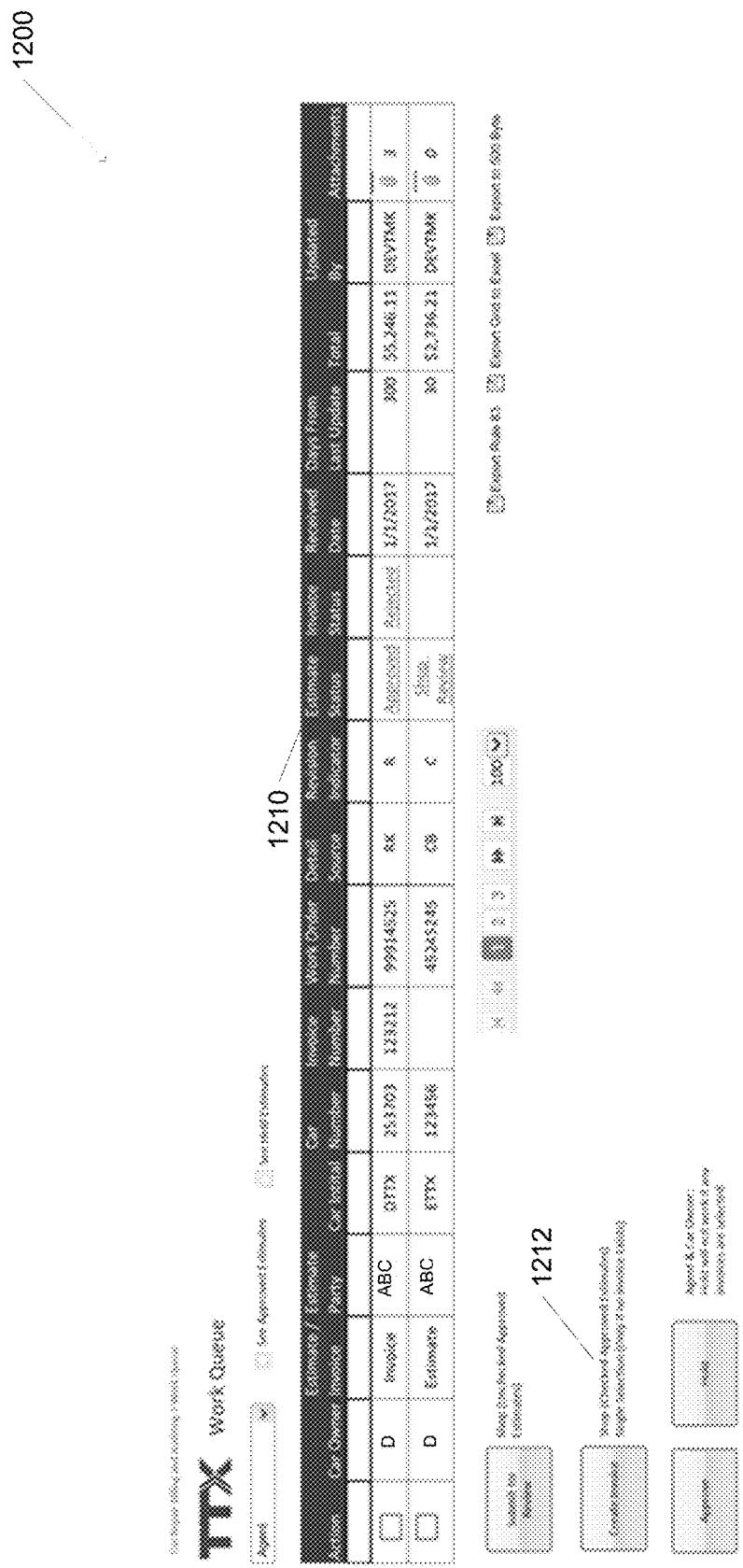

A screenshot of a user interface for interacting with a work queue in accordance with an embodiment of the invention is shown in FIG. 12. The work queue interface 1200 includes a work order queue 1210 and a set of actions 1212. The work order queue 1210 can include a set of tasks (e.g. estimates and/or invoices) associated with a task tracking device. The set of tasks can include any task which has not been finally completed and approved, such as rejected invoices and pending estimates. The set of actions 1212 can include one or more actions that can be performed with respect to a selected task. These actions can include, but are not limited to, submitting a task for review, creating an invoice, approving a task, and holding a task. The available actions can be based on the type of task selected and/or a security role associated with a task tracking device displaying the work queue interface 1200.

Task tracking processes can further include generating and/or sending a variety of notifications, such as emails. Notifications can be automatically generated and sent based on any of a variety of interactions with user interfaces as described herein. Notifications can include exceptions (e.g. car initials, car number, work order number, invoice number, detail source, level, error code, exception description), work order acceptances (e.g. car initial, car number, work order number, invoice number, received date, detail source, status link, etc.), invoice approvals (e.g. car initial, car number, work order #, invoice #, original received date, detail source, invoice approval date, invoice paid date, invoice status, invoice amount), estimate status/work queues (e.g. car initial, car number, work order #, invoice #, original received date, detail source, estimate status), and/or any other data as appropriate to the specific requirements of applications of the invention.

Although a variety of user interfaces are shown and described with respect to FIGS. 3-12, it should be noted that any of a variety of user interfaces and standardized data format other than Railinc can be utilized as appropriate to the specific requirements of various embodiments of the invention.

Generating Work Orders

A variety of task tracking processes can include generating work orders. A work order can indicate one or more tasks to be performed to repair damage to one or more components of a rail car and/or perform maintenance to one or more components of a rail car. Each component of a rail car can be associated with one or more owners that are responsible for the particular component. An estimate and/or invoice can indicate a variety of data, such as a cost associated with performing each of the tasks, for the work order. Based on the components identified in the work order, the responsibility for each component owner can be determined based on the estimate and/or invoice. In a variety of embodiments, the owner of a component is determined based on a unit type identified in the work order, estimate, and/or invoice. In many embodiments, multiple owners can be determined for a single component. A detail source can be indicated in a work order and can describe the type of damage to a component and/or an indication of severity of the damage to the component. A detail source can also indicate a source of the inspection to determine the damage to the components. For example, a detail source can indicate a joint inspection between the party causing the damage to the component and the owner of the component. The detail sources can be obtained from a third-party database, such as an Umler database and/or a damaged and defective car tracking database. The third-party database can also include ownership information for a component and the ownership information can be obtained based on one or more identification numbers associated with the rail car and/or components of the rail car. In a variety of embodiments, a third-party database can be queried to determine if one or more tasks indicated in a work order are properly indicated and/or coded. A user interface provided by a task tracking system can automatically obtain the detail source information from a third-party database and aggregate the data into a single user interface, provided with a common look and feel, to provide a single point for verification of the work order, estimate, and/or invoice.

In a variety of embodiments, a detail source can be automatically generated by capturing image data of a component of a rail car and processing the image data to identify one or more features within the image data. In several embodiments, the image data can be processed using one or more machine classifiers that automatically identify features within the data along with a probabilistic likelihood that the feature is present within the image data. Machine classifiers can also determine a level of severity associated with the determined features and a probabilistic likelihood that the feature indicated damage with the determined level of severity. The machine classifiers can be trained using a set of training data including images of components of rail cars, an indication of features within the image data, and a label indicating a severity associated with the indicated features. It should be readily apparent to one having ordinary skill in the art that a variety of machine classifiers can be utilized including (but not limited to) decision trees, k-nearest neighbors, support vector machines (SVM), neural networks (NN), recurrent neural networks (RNN), convolutional neural networks (CNN), and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers can be utilized, more specific machine classifiers when available, and general machine classifiers at other times can further increase the accuracy of predictions.

Figure 13:
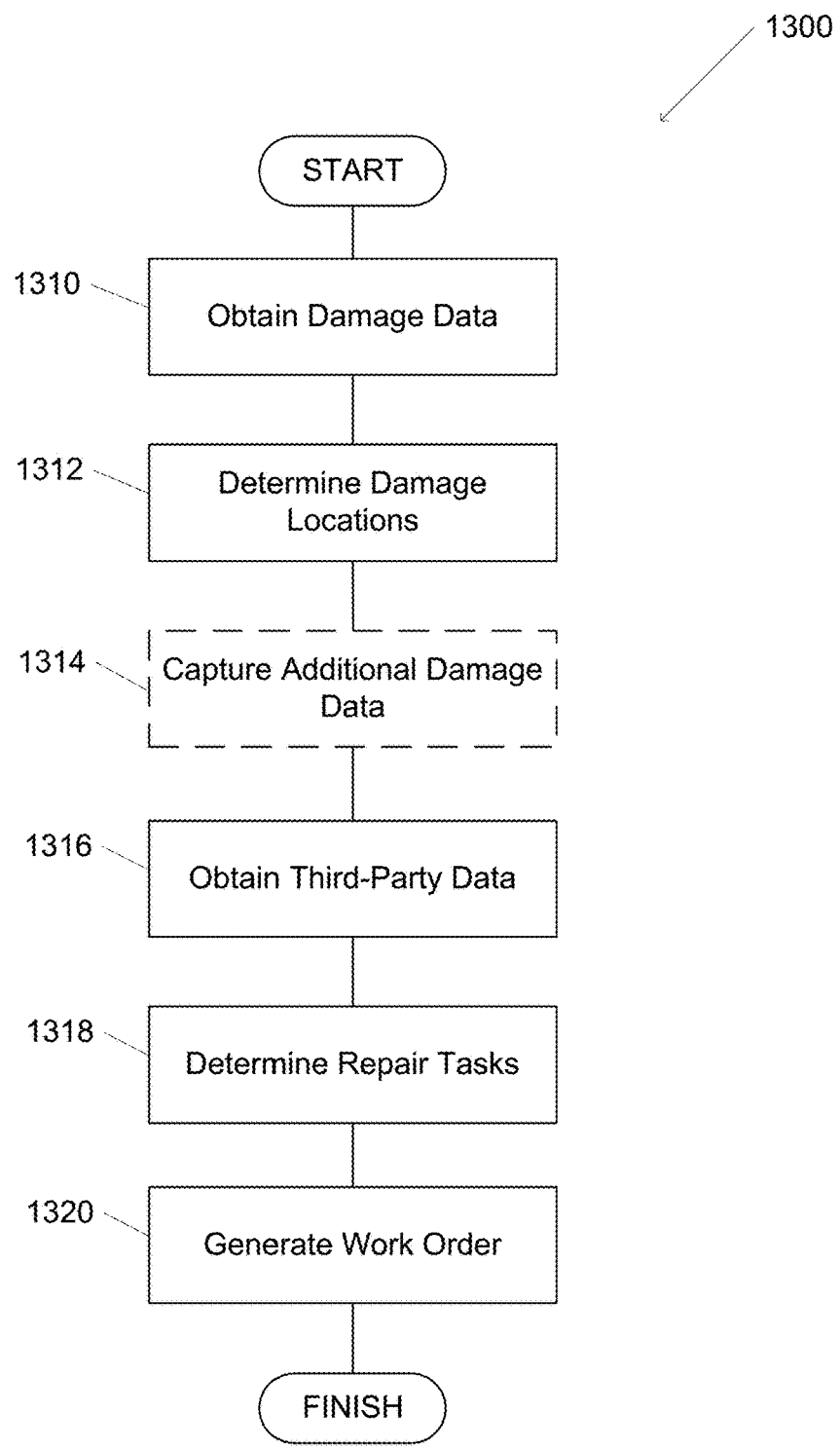
FIG. 13 is a flow chart illustrating a process for generating a work order in accordance with an embodiment of the invention.

FIG. 13 is a flow chart illustrating a process for generating a work order in accordance with an embodiment of the invention. The process 1300 includes obtaining (1310) damage data. The damage data can be indicated in one or more work orders. In several embodiments, the damage data includes a set of image data showing one or more components of a rail car. The damage data can also include an identification of a rail car, such as rail car initials and/or a rail car number. The damage data can indicate a location of the rail car, such as a service center where the rail car is located and/or a geographic location where the component was damaged. Damage locations can be determined (1312). Damage locations can include, but are not limited to, the damaged component and/or a specific portion of a component. In many embodiments, damage locations are determined by processing the damage data using a machine classifier. In many embodiments, additional damage data can be captured (1314). Additional damage data can be captured when additional information regarding the damage to a particular component is needed. In a variety of embodiments, additional damage data is captured using an imaging device when a probabilistic likelihood of determined damage and/or damage severity, calculated by a machine classifier, is below a threshold likelihood. Third-party data can be obtained (1316). The third-party data can include owner information and/or damage information obtained from any of a variety of third-party databases. Repair tasks can be determined (1318). The repair tasks can be determined based on the damage data, the damaged component, and/or the severity of the damage. In a number of embodiments, repair tasks can be determined based on damage identified in the damage data by a machine classifier. A work order can be generated (1320). The work order can include any tasks indicated in the damage data along with any additional repair tasks identified in the (additional) damage data. The work order can further include identifying information regarding the components of a rail car and/or any other data as described herein.

Specific examples of processes for generating work orders are described with respect to FIG. 13; however, any other processes, including those processes which obtain damage data from a third-party database, can be performed in accordance with embodiments of the invention. Work orders can be transmitted to devices, such as a task tracking device, associated with a service center where the rail car is located and/or will be transferred to so the tasks indicated in the work order can be performed. In several embodiments, the work orders can be transmitted to a third-party database and obtained by a device associated with the service center. In a number of embodiments, the service center is in a geographic region where the rail car is located and/or where the rail car was damaged.

Generating Estimates

A variety of task tracking processes can include generating estimates for a work order. Estimate data can indicate a cost and/or labor time for repairing and/or maintaining one or more components of a rail car by a particular service center. In several embodiments, an estimate can be automatically generated based on damage data describing the damage to the components of the rail car and rate data associated with the service center. The rate data can include, but is not limited to, an hourly charge for labor and a labor-hour estimate to repair a particular component. The hourly charge and/or labor-hour estimate can be based on an identification of the rail car and/or component, the type of damage to the component, the severity of the damage, any maintenance to be performed to the component and/or rail car, and/or any other factors as appropriate to specific applications of embodiments of the invention. In several embodiments, the specific tasks quoted in an estimate can be verified by correlating the tasks indicated in the work order to a set of damages indicated in a third-party incident database. Third-party incident databases can include an automatically generated indication of damages to particular rail cars and/or components to rail cars. In several embodiments, the third-party incidents are automatically generated by one or more tracking devices installed on one or more components of the rail car. In several embodiments, the work order can be updated based on damage indicated in the third-party incident database that is not present in the work order. In a number of embodiments, the third-party incident database can be updated based on damages indicated in the work order that are not present in the third-party incident database. The cost associated with repairing and/or maintaining a component can be automatically split based on ownership interests in the rail car and/or component as described herein. The relative costs can be indicated in the estimate data. The estimate data can also indicate any other data in a work order and/or estimate data as described herein.

Figure 14:
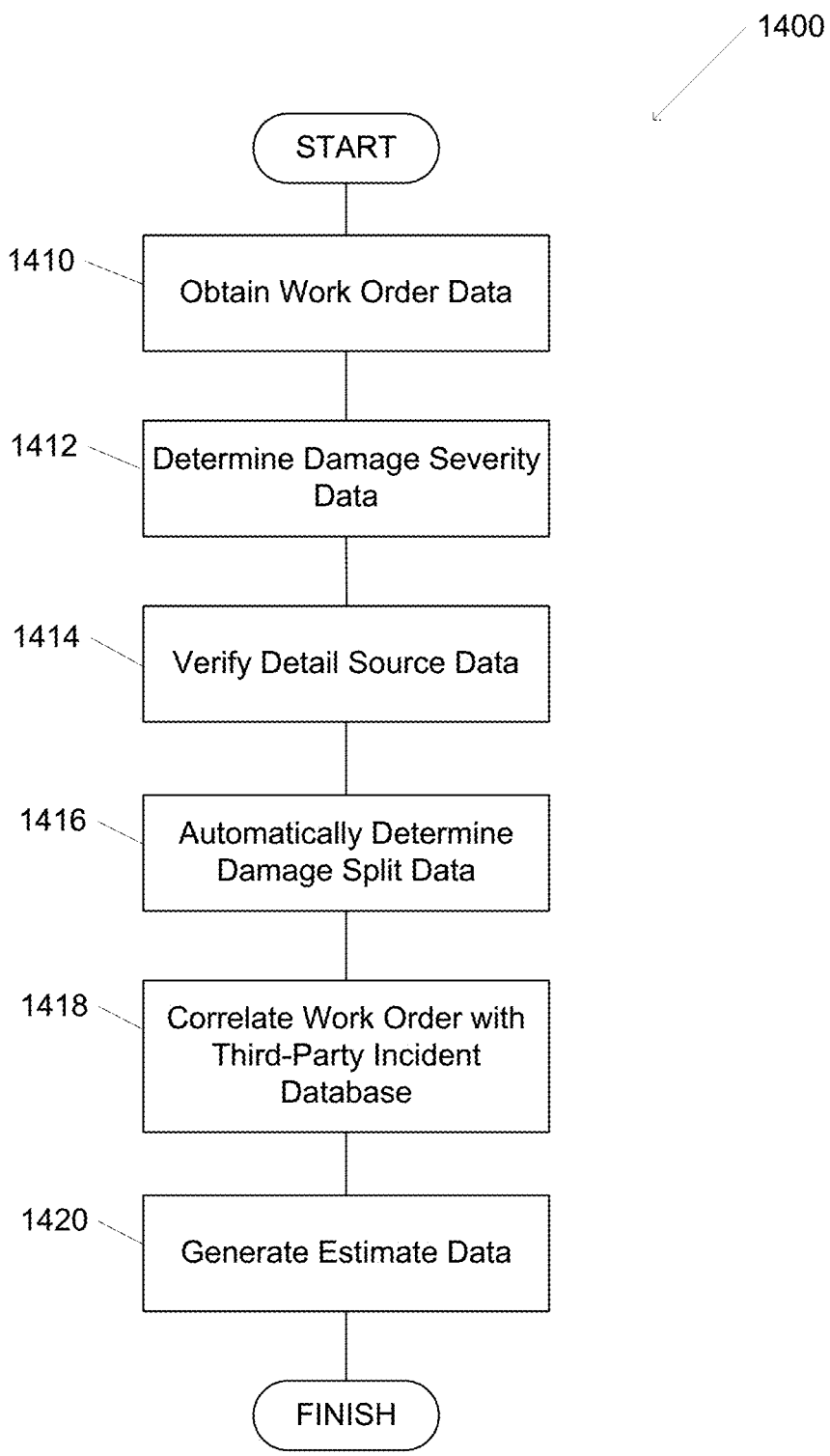
FIG. 14 is a flow chart illustrating a process for generating an estimate in accordance with an embodiment of the invention.

FIG. 14 is a flow chart illustrating a process for generating an estimate in accordance with an embodiment of the invention. The process 1400 can include obtaining (1410) work order data. In many embodiments, the work order data includes a detail source indicating one or more parties responsible for generating the work order. Damage severity data can be determined (1412). In a variety of embodiments, the damage severity data is generated using one or more machine classifiers as described herein. Detail source data can be verified (1414). In a number of embodiments, the detail source data can be verified by comparing the detail source indicated in the work order data with a detail source obtained from a third-party database. Damage split data can be automatically determined (1416). The damage split data can be automatically determined based on ownership interests in the rail car and/or damaged components. The ownership interests can be indicated in the work order and/or obtained from a third-party database. Work order data can be correlated (1418) with a third-party incident database. The third-party incident database can include indications of damage to rail cars that are automatically generated when the incident occurred. In many embodiments, the third-party incidents are generated by an inspection device generating damage data for a rail car after an incident has occurred. The work order can be correlated (1418) with the third-party database to ensure that the work order indicates repairs and/or maintenance to be performed that corresponds to the damage to the rail car. Correlating (1418) work orders can include updating the third-party incident database to include damage data determined during the generation of the work order, such as by machine classifiers as described herein. Estimate data can be generated (1420). The estimate data can include an indication of damage to a component, the damaged component, an identifier of the damaged component and/or rail car associated with the component, a cost for repairing the damage, any maintenance items to be performed to the rail car and/or component, and/or any other data as described herein.

Although specific examples of processes for generating estimates are described with respect to FIG. 14, any other processes, including those processes that validate estimates based on a work order using techniques similar to those described above, can be performed in accordance with embodiments of the invention.

Approving Invoices

Task tracking processes can include approving invoices. Invoices can be associated with a work order and/or an estimate associated with the work order. The invoice can include a set of tasks performed along with an invoiced amount for the performed tasks along with any other data as described herein. In several embodiments, the invoice data includes image data of the components of the rail car corresponding to the performed tasks as proof that the indicated tasks were completed. Invoices can be approved before payment is issued and/or the work order is marked as completed. In several embodiments, invoices can be validated to ensure that the tasks indicated in the corresponding work order and/or estimate were completed and that the invoiced amount is within a threshold amount of the estimated amount for the indicated tasks. For example, if the estimate indicated a cost of completing a set of tasks is $100, an invoice that is within 2% of the estimated amount (e.g. an invoice for an amount in the range of $98-$102) can be automatically as described herein. The threshold amount can be determined based on the rail car, the components, the ownership interests of the rail car and/or components, and/or a variety of other factors as appropriate to the requirements of specific applications of embodiments of the invention. In many embodiments, validating the invoice includes determining if the invoiced amount is below a threshold value. In several embodiments, if an invoice is below a threshold value and within a threshold variance of the corresponding estimate, the invoice can be automatically approved. Auditing an invoice can include determining a number of tasks indicated in the corresponding estimate data that are not indicated as performed in the invoice data and/or determining tasks that were indicated as performed in the invoice data and not indicated in the corresponding estimate data. The differences between estimated tasks and invoiced tasks can be determined based on one or more attributes of the tasks. For example, an estimated task may include an oil filter change while the invoiced repair includes an air filter change. These tasks are not equivalent and changing the air filter does not indicate that the oil change task was completed. In a second example, an estimated task may include an oil change and the invoiced tasks may include an oil filter change. As changing an oil filter is a typical step in an oil change process, changing the oil filter can indicate that the oil change task was completed. Estimated tasks and invoiced tasks can be audited by comparing job codes for the estimated tasks and the job codes for the invoiced tasks. Job codes can identify particular tasks and, in several embodiments, can be obtained from a third-party database. If an invoice includes job codes that are not indicated in the corresponding estimate data, the invoice can be flagged as having new data and/or revised data during the audit of the invoice. The differences between the estimated job codes and the invoiced job codes can be classified as important or unimportant. Important differences indicate that a substantial delta exists between the estimated tasks and the invoiced tasks, while unimportant differences indicate an insignificant delta exists between the estimated tasks and the invoiced tasks, such as described in the examples above. Invoices with new data can be denied and re-submitted for approval as described herein, while invoices with revised data can be approved as described herein. Invoices can also be audited to determine that only valid job codes and/or tasks are performed with respect to the particular components and/or rail car. For example, if a rail car is an electric rail car, an oil change job code does not represent a valid job code as an electric rail car does not require oil changes. Auditing an invoice can also include determining if the invoice has been previously presented and/or paid. The status of previous invoices and/or the payment status of an invoice can be determined based on an identifier associated with the invoice, estimate, and/or work order and can be obtained from a third-party database. An invoice can be approved when the invoice has been successfully audited. As indicated above, invoices can be automatically approved when some or all of the job codes indicated in the corresponding estimate data have been completed and the invoiced amount is within a threshold value of the estimated amount. Invoices can also be approved and/or automatically reprocessed based on the audit results and/or invoiced amount.

Figure 15:
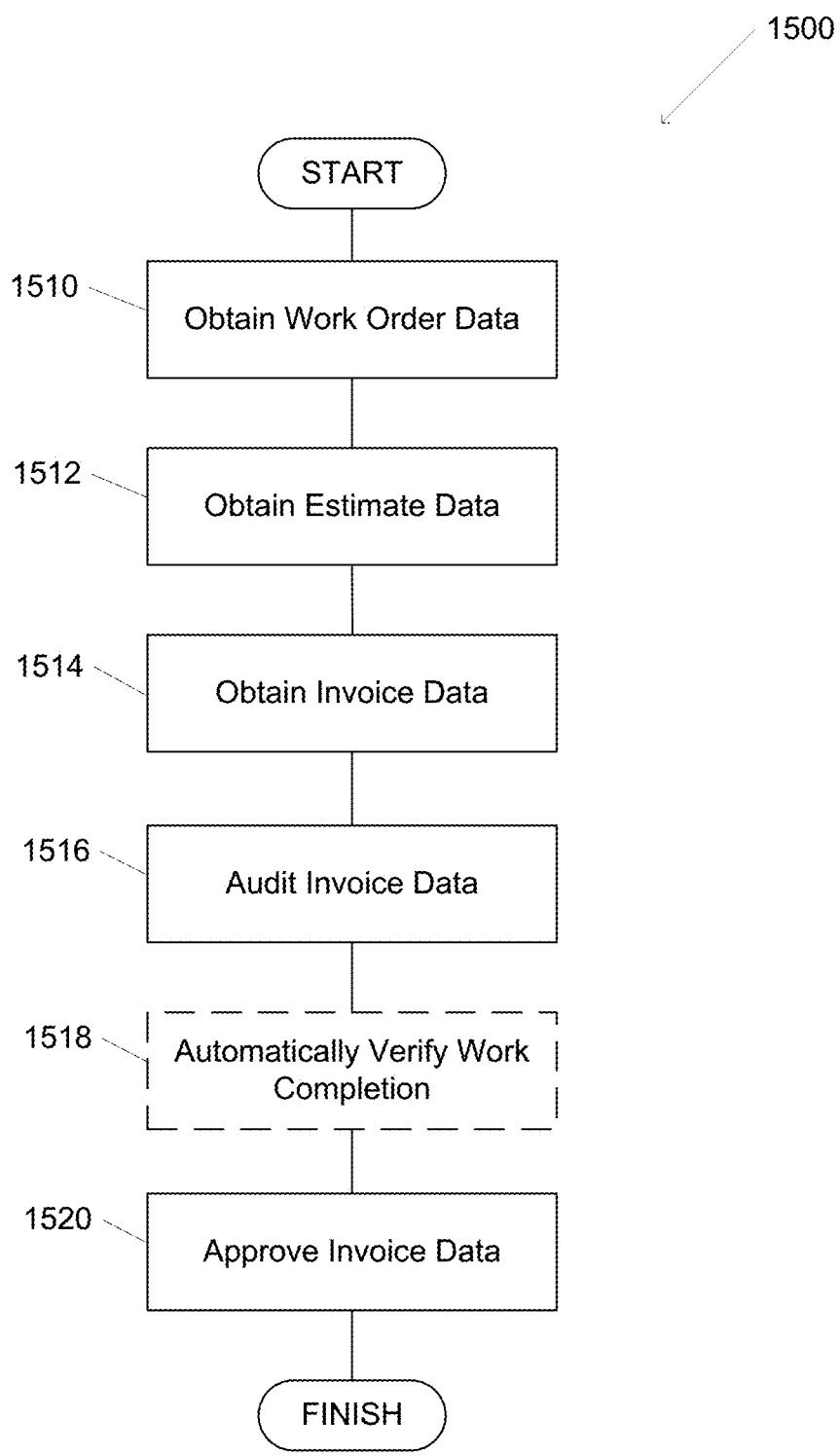
FIG. 15 is a flow chart illustrating a process for approving a work order in accordance with an embodiment of the invention.

FIG. 15 is a flow chart illustrating a process for approving a work order in accordance with an embodiment of the invention. Process 1500 includes obtaining (1510) work order data, obtaining (1512) estimate data, and obtaining (1514) invoice data. The estimate data and invoice data can be associated with the obtained work order data. In many embodiments, the estimate data is generated prior to tasks indicated in the work order data being performed. In several embodiments, the invoice data is generated once the tasks indicated in the work order data and/or estimate data being performed. Invoice data can be audited (1516). The invoice data can be audited to ensure that the tasks indicated in the work order data and/or estimate data were performed and/or that tasks not indicated in the work order data and/or estimate data were not performed. Auditing the invoice data can include determining that labor hours and/or total costs for particular tasks are within a threshold amount of the corresponding estimates for the tasks indicated in the estimate data. The invoice data can be audited to determine that only valid tasks were performed based on the components and/or rail car. In several embodiments, work completion can be automatically verified (1518). Work completion can be automatically verified by obtaining image data of the components and/or rail car indicated in the work order and processing the image data to determine that the damaged components have been repaired as indicated in the invoice data. In several embodiments, maintenance tasks can be automatically verified by obtaining image data showing a maintenance tag and processing the image data to determine the next maintenance date for the tagged component. Image data can be processed using one or more machine classifiers as described herein to determine a probabilistic likelihood that the tasks indicated in the work order data were completed as indicated in the invoice data. Invoice data can be approved (1520). In several embodiments, invoice data can be automatically approved when the invoiced amount is within a threshold percentage of the estimated amount for the indicated tasks. In many embodiments invoice data can be approved based on a probabilistic likelihood that the tasks have been completed exceeding a threshold value.

Specific examples of processes for generating work orders are described with respect to FIG. 15; however, any other processes, including those processes which obtain damage data from a third-party database, can be performed in accordance with embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It can be evident to the annotator skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and can be modified wherever deemed suitable by the skilled annotator, except where expressly required. Accordingly, the scope of the invention should be determined not by the embodiments illustrated, but by the appended claims and their equivalents.

What is claimed is:

1. A method, comprising:
    training, using a plurality of images of components of rail cars, one or more indications of features within the plurality of images, and one or more labels indicating a severity associated with the one or more indications of features, a first neural network machine classifier and a second neural network machine classifier;
    presenting, using a user interface associated with a task tracking server system, an upload dialogue for damage data;
    receiving, via the user interface, the damage data indicating damage to a component of a rail car;
    obtaining, by the task tracking server system after the training, the damage data;
    determining, by the task tracking server system and by using the first neural network machine classifier and based on the damage data, a first output comprising a location of the damage on the component;
determining, by the task tracking server system and based on the second neural network machine classifier determining that a threshold likelihood of determining damage from the damage data is not satisfied, to capture additional damage data;
obtaining, by the task tracking server system, the additional damage data;
determining, by the task tracking server system, and based on the additional damage data, task data indicating the damage and the component, wherein the task data indicates a type of repair to the component to correct the indicated damage;
obtaining, by the task tracking server system and from a third-party database, ownership data indicating a responsible party for the component and a responsible party for the rail car;
obtaining, by the task tracking server system, a current geographic location of the rail car indicated in the damage data;
generating, by the task tracking server system, a work order comprising the damage data and the task data;
determining, by the task tracking server system, a service center that is proximate with the current geographic location;
transmitting, by the task tracking server system, the work order to a task tracking device associated with the service center;
providing an interactive user interface comprising search option elements listed in a use r-selectable drop down; and
providing, in response to a user selection of a search option element listed in the user-selectable drop down, and based on determining a service provider access has been granted, a plurality of tasks for a historic period, wherein the plurality of tasks comprises the work order.

2. The method of claim 1, further comprising:
determining, by the task tracking server system, severity data based on the damage data, wherein the severity data indicates a severity of the damage to the component; and
generating the task data based on the severity data.

3. The method of claim 1, wherein:
the damage data comprises image data; and
wherein the task data is determined by processing the image data using the second neural network machine classifier to generate an indication of a type of damage represented in the image data and a probabilistic likelihood that the damage to the component corresponds to the indicated type of damage.

4. The method of claim 3, further comprising:
determining, by the task tracking server system, that the probabilistic likelihood is below a threshold value; and
based on the probabilistic likelihood being below the threshold value, obtaining additional damage data for the component.

5. The method of claim 1, further comprising:
determining, by the task tracking server system, a detail source corresponding to the damage data; and
obtaining the damage data from a third-party database based on the detail source.

6. The method of claim 5, further comprising determining the ownership data from the third-party database based on the detail source.

7. The method of claim 1, wherein: the damage data, the task data, and the ownership data are in a standardized format.

8. A task tracking server system, comprising:
at least one processor; and
memory storing instructions that, when read by the at least one processor, cause the task tracking server system to:
train, using a plurality of images of components of rail cars, one or more indications of features within the plurality of images, and one or more labels indicating a severity associated with the one or more indications of features, a first neural network machine classifier and a second neural network machine classifier;
present a user interface comprising an upload dialogue for damage data;
obtain, after the training and based on feedback from the user interface, the damage data indicating damage to a component of a rail car;
obtain a current geographic location of the rail car indicated in the damage data;
determine a service center that is proximate with the current geographic location;
determine, by using the first neural network machine classifier and based on the damage data, a first output comprising a location of the damage on the component;
determine, based on the second neural network machine classifier determining that a threshold likelihood of determining damage from the damage data is not satisfied, to capture additional damage data;
obtain the additional damage data;
determine, based on the additional damage data, task data indicating the damage and the component, wherein the task data indicates a type of repair to the component to correct the indicated damage;
obtain, from a third-party database, ownership data indicating a responsible party for the component and a responsible party for the rail car;
generate a work order comprising the damage data and the task data;
transmit the work order to a task tracking device associated with the service center;
provide an interactive user interface comprising search option elements listed in a user-selectable drop down; and
provide, in response to a user selection of a search option element listed in the user-selectable drop down, and based on determining a service provider access has been granted, a plurality of tasks for a historic period, wherein the plurality of tasks comprises the work order.

9. The task tracking server system of claim 8, wherein the instructions, when ready by the at least one processor, further cause the task tracking server system to:
determine severity data based on the damage data, wherein the severity data indicates a severity of the damage to the component; and
generate the task data based on the severity data.

10. The task tracking server system of claim 8, wherein:
the damage data comprises image data; and
wherein the task data is determined by processing the image data using the second neural network machine classifier to generate an indication of a type of damage represented in the image data and a probabilistic likelihood that the damage to the component corresponds to the indicated type of damage.

11. The task tracking server system of claim 10, wherein the instructions, when ready by the at least one processor, further cause the task tracking server system to:
 determine that the probabilistic likelihood is below a threshold value; and
 based on the probabilistic likelihood being below the threshold value, obtain additional damage data for the component.

12. The task tracking server system of claim 8, wherein the instructions, when ready by the at least one processor, further cause the task tracking server system to:
 determine a detail source corresponding to the damage data; and
 obtain the damage data from a third-party database based on the detail source.

13. The task tracking server system of claim 12, wherein the instructions, when ready by the at least one processor, further cause the task tracking server system to determine the ownership data from the third-party database based on the detail source.

14. The task tracking server system of claim 8, wherein the damage data, the task data, and the ownership data are in a standardized format.

15. A non-transitory machine-readable medium storing instructions that, when executed by one or more processors, cause the one or more processors to perform steps comprising:
 training, using a plurality of images of components of rail cars, one or more indications of features within the plurality of images, and one or more labels indicating a severity associated with the one or more indications of features, a first neural network machine classifier and a second neural network machine classifier;
 presenting, using a user interface, an upload dialogue for damage data;
 obtaining, after the training and based on feedback from the user interface, the damage data;
 obtaining a current geographic location of the rail car indicated in the damage data;
 determining a service center that is proximate with the current geographic location
 determining, by using the first neural network machine classifier and based on the damage data, a first output comprising a location of the damage on the component;
 determining, based on the second neural network machine classifier determining that a threshold likelihood of determining damage from the damage data is not satisfied, to capture additional damage data;
 obtaining the additional damage data;
 determining, based on the additional damage data, task data indicating the damage and the component, wherein the task data indicates a type of repair to the component to correct the indicated damage;
 obtaining ownership data indicating a responsible party for the component and a responsible party for the rail car;
 generating a work order comprising the damage data and the task data;
 transmitting the work order to a task tracking device associated with the service center;
 providing an interactive user interface comprising search option elements listed in a use r-selectable drop down; and
 providing, in response to a user selection of a search option element listed in the user-selectable drop down, and based on determining a service provider access has been granted, a plurality of tasks for a historic period, wherein the plurality of tasks comprises the work order.

16. The non-transitory machine-readable medium of claim 15, wherein the instructions further cause the one or more processors to perform steps comprising:
 determining severity data based on the damage data, wherein the severity data indicates a severity of the damage to the component; and
 generating the task data based on the severity data.

17. The non-transitory machine-readable medium of claim 15, wherein:
 the damage data comprises image data; and
 wherein the task data is determined by processing the image data using the second neural network machine classifier to generate an indication of a type of damage represented in the image data and a probabilistic likelihood that the damage to the component corresponds to the indicated type of damage.

18. The non-transitory machine-readable medium of claim 17, wherein the instructions further cause the one or more processors to perform steps comprising:
 determining that the probabilistic likelihood is below a threshold value; and
 based on the probabilistic likelihood being below the threshold value, obtaining additional damage data for the component.

19. The non-transitory machine-readable medium of claim 15, wherein the instructions further cause the one or more processors to perform steps comprising:
 determining a detail source corresponding to the damage data; and
 obtaining the damage data from a third-party database based on the detail source.

20. The non-transitory machine-readable medium of claim 15, wherein the damage data, the task data, and the ownership data are in a standardized format.

* * * * *